(12) United States Patent
Nishimura et al.

(10) Patent No.: US 6,212,879 B1
(45) Date of Patent: Apr. 10, 2001

(54) FUEL COMBUSTION CONTROL SYSTEM FOR ENGINE

(75) Inventors: Hirofumi Nishimura, Hiroshima; Junichi Taga; Takahisa Ishihara, both of Higashihiroshima; Eiji Nishimura, Hiroshima, all of (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/130,037

(22) Filed: Aug. 4, 1998

(30) Foreign Application Priority Data

Aug. 6, 1997 (JP) .................................................. 9-211672
Jul. 13, 1998 (JP) ................................................ 10-197337

(51) Int. Cl.$^7$ ...................................................... F01N 3/00
(52) U.S. Cl. ................................. 60/274; 60/284; 60/285; 123/424; 123/425

(58) Field of Search ............................. 60/284, 276, 285, 60/277, 278, 299, 301; 123/424, 425

(56) References Cited

FOREIGN PATENT DOCUMENTS

| 8-218995 | 8/1996 | (JP) . |
| 8-232645 | 9/1996 | (JP) . |

Primary Examiner—Jeanette Chapman
Assistant Examiner—Sueh Varma
(74) Attorney, Agent, or Firm—Sidley & Austin; Hugh A. Abrams

(57) ABSTRACT

A fuel combustion control system for an internal combustion engine having an exhaust gas purifying catalyst installed in an exhaust line therein advances an ignition timing to try to stabilize combustion when a fluctuation of engine speed is larger than a limit speed on stable combustion and further retards an ignition timing to accelerate a rise in catalyst temperature together with securing combustion stability while the engine is still cold or when a fluctuation of engine speed is smaller than the limit speed on stable combustion.

18 Claims, 30 Drawing Sheets

ROTATIONAL ORDER

FIG. 26A ENGINE SPEED
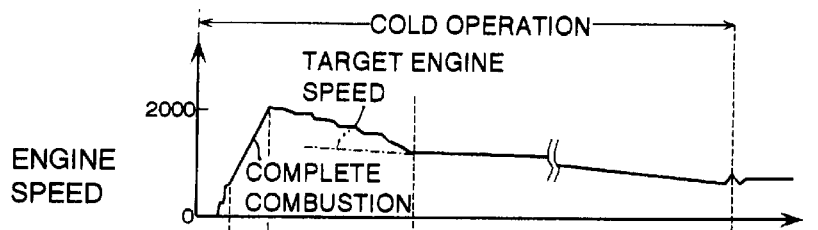
FIG. 26B IGNITION TIMING
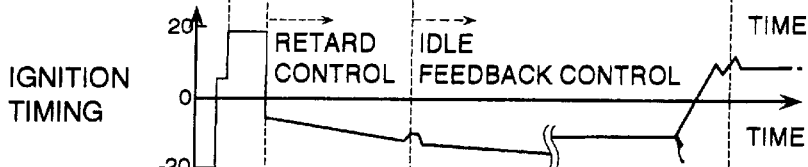
FIG. 26C AIR/FUEL RATIO
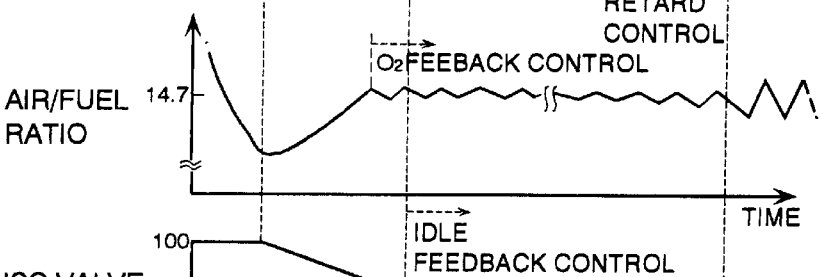
FIG. 26D ISC VALVE DUTY RATIO
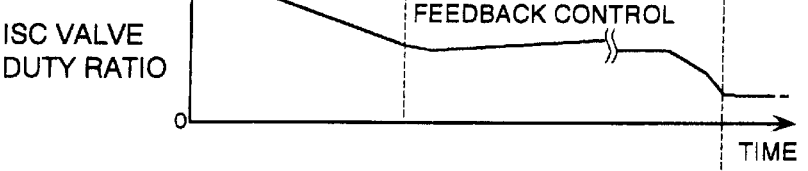
FIG. 26E SENSOR GAIN
FIG. 26F SWIRL VALVE
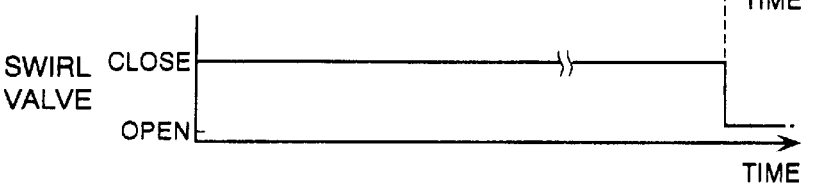

FUEL COMBUSTION CONTROL SYSTEM FOR ENGINE

BACKGROUND OF THE INVENTION

1. Field of the Invention

The invention relates to a control system for an internal combustion engine equipped with a catalytic converter for purifying exhaust gas from the engine, and, more particularly, to a fuel combustion control system for providing combustion stability when an ignition timing is retarded in order to rise the temperature of a catalyst of the catalytic converter during a cold start of the engine.

2. Description of the Related Art

Typically, there have been known various types of catalytic converters for purifying exhaust gas from an engine. Such an catalytic converter incorporates a three way catalyst to purify or significantly lower emission levels of unburnt hydrocarbons (HC), carbon monoxide (CO), oxides of nitrogen (NOx) and the like which can pose a health problem for the nation if uncontrolled. The three way catalyst is hard to present desired catalytic conversion efficiency if it is at lower temperatures and is, however, activated to present catalytic conversion efficiency when heated higher than a specific temperature sufficiently.

In this type of engine control system, it has been known to accelerate a rise in catalyst temperature by significantly retarding an ignition timing after top dead center to present desired catalytic conversion efficiency which is dictated by a temperature of engine cooling water while the catalyst has not yet attained an activated condition necessary. One of the engine control systems of this type is known from, for example, Japanese Unexamined Patent Publication No. 8-232645. This engine control system causes a large retard of an ignition timing to provide a large exhaust heat loss with an effect of rising an exhaust gas temperature, as a result of which the catalyst is quickly heated and activated sufficiently. Further, in order to prevent fuel combustion from being made unstable due to a retard of ignition timing, the engine control system is designed and adapted to improve ignitability and combustibility of an air-fuel mixture by generating a swirl of intake air in the combustion chamber, increasing a speed of an intake air stream or rising ignition energy.

The prior art engine control system has a necessity to have much scope for controlling an engine, so that the engine does not exceed a limit on necessary combustion stability. This imposes a restraint on retarding an ignition timing to its limit. In view of this, it is desired to improve activation of the catalyst by rising the temperature of exhaust gas.

As a practical matter, fuel is varies in quality such as heaviness to some extent, so that it is the possibility that the engine is deprived of combustion stability if a fuel of inferior ignitability and combustibility is used. When a limit to combustion stability is exceeded, the engine encounters an increase in vibration and a sharp increase in harmful emission level.

SUMMARY OF THE INVENTION

It is an objective of the invention to provide a fuel combustion control system which provides greater acceleration of a rise in catalyst temperature as well as ensuring combustion stability during a cold engine start by feedback controlling actual combustion within limits on combustion stability.

The foregoing object of the present invention is achieved by detecting a state of combustion based on fluctuations of engine speed and controlling engine operation according to the state of combustion. Specifically, the fuel combustion control system for an engine equipped with an exhaust gas purifying catalyst installed in an exhaust line for controlling acceleration of a rise in catalyst temperature by retarding an ignition timing from a point at which the engine produces maximum output torque while the exhaust gas purifying catalyst remains inactive or is not yet warmed sufficiently determines fluctuations of engine speed and controls fuel combustion by controlling at least one control value of an ignition timing, an air-fuel ratio and an air flow in an combustion chamber of the engine so as to maintain the fluctuations within limits on combustion stability while the catalyst remains inactive giving the ignition timing control priority. The fuel combustion control system incorporates a crankangle sensor to monitor a crankangular velocity based on which a fluctuation of engine speed is determined.

With the fuel combustion control system, when there is a demand for accelerating a rise in catalyst temperature while the catalyst is not yet warmed up nor activated, the control system determines fluctuations of engine speed based on crankangular velocity and performs fuel combustion control so as to maintain the fluctuations of engine speed within a limit on desired combustion stability. The fuel combustion control develops stable combustion by advancing an ignition timing, changing an air-fuel ratio toward the richer side, producing a swirl of intake air in the combustion chamber, or rising a velocity of intake air flow. Because the determination of an actual state of combustion based on fluctuations of engine speed is precise, an ignition timing can be advanced as large as possible so as to provide the greatest acceleration of a rise in catalyst temperature within limits on combustion stability as well as ensuring engine combustion stability. Further, the determination of an actual state of combustion based on fluctuations of engine speed also realizes greater acceleration of a rise in catalyst temperature as well as engine combustion stability even if there are changes in fuel ignitability and combustibility due to difference in fuel quality such as heaviness.

Giving the ignition timing control priority leads to satisfactory stabilization of fuel combustion. Concurrently, it is possible, for example, to deliver an air-fuel mixture leaner than a stoichiometric mixture, which is always desirable to rise a catalyst temperature with an effect of lowering the emission level of hydrocarbons (HC) and carbon monoxide (CO).

Variable air intake means for varying intake air quantity bypassing an engine throttle valve and admitted to the engine and idle detection means for detecting idling of the engine may be incorporated to the fuel combustion control system. In this instance, the fuel combustion control system controls an ignition timing to perform engine speed feedback control so as to attain a predetermined idle engine speed while the idle detection means detects idling of the engine, and interrupts the engine speed feedback control during the control of the variable air intake means to provide an increase in intake air quantity while performing acceleration of a rise in catalyst temperature when the idle detection means detects idling of the engine.

When acceleration of a rise in catalyst temperature by retarding an ignition timing is interrupted during idling, the engine speed is feedback controlled to a predetermined idle speed in quick response to a change in ignition timing. On the other hand, while acceleration of a rise in catalyst temperature by retarding an ignition timing is executed, a change in ignition timing is not caused, so that the engine is prevented from suffering unstable operation such as hunting.

Further, the variable air intake means is controlled to provide an increase in intake air quantity so as to remain a desired air charging efficiency or a desired engine speed such as a predetermined idle speed. This prevents the engine from dropping its speed due to retarding an ignition timing. In this instance, the variable air intake means may be controlled to provide an increase in intake air quantity so that an engine speed ascends higher than the predetermined idle speed, with an effect of stabilizing engine operation and accelerating a rise in catalyst temperature due to an increase in exhaust heat energy.

The detection of fluctuations of engine speed and the combustion control are made for each cylinder. Generally, because there are variations of fuel injection quantity, combustion temperature, intake air flow and so forth among cylinders, if controlling fuel combustion for the cylinders all together, the control of combustion stability must be performed in accordance with one of the cylinders which is most unstable in combustion, which makes it hard to control the remaining cylinders to operate at marginal combustion stability. However, with the fuel combustion control system of the invention, the respective cylinders are independently controlled to operate at their marginal combustion stability by controlling independently fuel combustion at each cylinder to maintain the fluctuations within the limit.

The fuel combustion control system may judge activation of the catalyst for a lapse of a predetermined time from an engine start while the temperature of engine cooling water is lower than a predetermined temperature. Further, the fuel combustion control system may makes a judgement of heaviness of a fuel based on fluctuations of engine speed and change a control value by a relatively large fixed increment or a relatively large fixed decrement based on the fuel heaviness to stabilize fuel combustion.

A heavy fuel is relatively hard to vaporize and consequently has poor ignitability, which always leads to poor combustion stability. For this reason, with the fuel combustion control system of the invention, the fuel combustion control value is shifted toward the side where combustion stability is ensured according to fuel heaviness, so as to achieve stable combustion immediately after commencement of the fuel combustion control.

An ignition timing as the fuel combustion control value may be advanced more with an increase in fuel heaviness. Otherwise, an air-fuel ratio may be changed toward the rich side more with an increase in fuel heaviness. Advancing an ignition timing or rising an air-fuel ratio yields an increase in engine output torque and improvement of fuel combustibility with an effect of stabilizing engine operation and fuel combustion.

The fuel combustion control value, such as an ignition timing, an air-fuel ratio and an air flow, is learned when engine idling is detected and reflected on an initial control value. Because the engine runs at a relatively low speed during idling, it is easy to detect fluctuations of engine speed and further, the fuel combustion control value determined based on fluctuations of engine speed strongly reflects fuel heaviness and so forth, the fuel combustion control is suitably performed according to fuel heaviness concurrently with its commencement after having learned the fuel combustion control value once. Accordingly, combustion is stabilized immediately after an engine start.

According to another aspect of the invention, the fuel combustion control system performs fuel combustion control by controlling at least one control value of an ignition timing, an air-fuel ratio and an air flow in the combustion chamber of the engine so as to maintain the fluctuations of engine speed below a limit on combustion stability while the catalyst remains inactive and commences the fuel combustion control and the acceleration of a rise in catalyst temperature immediately when judging completion of an engine start.

With the fuel combustion control system, in addition to realizing greater acceleration of a rise in catalyst temperature as well as ensuring engine combustion stability, the catalyst is heated and activated in a short time immediately after completion of an engine start. The acceleration of a rise in catalyst temperature by a retard of ignition timing may be interrupted while the engine cooling water is at a temperature lower than a predetermined temperature, i.e. the engine is still cold. In the event where the engine is cold in a cold district where fuel vaporization is significantly aggravated, a retard of ignition timing is prohibited to give the stabilization of fuel combustion first priority, so that the engine is prevented from discharging an increased level of harmful emissions.

Completion of an engine start may be judged on the basis of a lapse of a predetermined period of time when the engine attains a specified engine speed lower than a predetermined idle engine speed. Specifically, when a predetermined period of time has expired from a point of time at which the engine attains a complete combustion state in which the self-sustaining operation is ensured and boosts its speed over a predetermined speed lower than the idle speed, it is determined that an engine start is completed. In other words, an ignition timing is controlled giving startability of the engine priority until the engine boosts its speed and retarded when combustion is stabilized after the engine has boosted its speed.

While the engine cooling water is at a temperature lower than the predetermined temperature, i.e. the engine is still cold, an air flow introduced into the combustion chamber may be intensified. In this instance, even while the engine is still cold, mixing of air and fuel is accelerated due to the intensified air flow with an effect of maintaining ignitability in spite of aggravation of fuel vaporization at lower temperatures.

Further, the fuel combustion control system may include variable air intake means for varying intake air quantity bypassing an engine throttle valve and admitted to the engine. In this instance, the fuel combustion control system controls the variable air intake means to vary intake air quantity to perform engine speed feedback control so as to attain a predetermined idle engine speed during idling of the engine, controls an ignition timing with a control value to feedback control an engine speed so as to attain a predetermined idle engine speed during idling of the engine, and reduces the control value while performing acceleration of a rise in catalyst temperature.

With the fuel combustion control system, while the engine is idling, the engine is controlled to attain the predetermined idle speed by varying intake air quantity and an ignition timing. Further, when there is a demand for accelerating a rise in catalyst temperature, the control value is reduced, so that adverse effects such as hunting of engine speed due to interference of the ignition timing control with the engine speed control are prevented or significantly reduced, and fluctuations in engine speed are lowered by the ignition timing control.

The fuel combustion control system may incorporate an air-fuel sensor normally activated after an engine start to monitor the oxygen concentration of exhaust gas from the engine by which an air-fuel ratio is represented and feedback control the air-fuel ratio to remain approximately a stoichiometric air-fuel ratio. Feedback controlling an air-fuel ratio is performed precisely based on an output from the air-fuel sensor, so as to lower sufficiently the level of harmful emissions. Although, while the engine cooling water is at a temperature lower than the predetermined temperature, i.e. the engine is still cold, combustion is apt to be affected by a change in air-fuel ratio due to a retard of ignition timing and even small changes in air-fuel ratio cause fluctuations of an engine speed, however, in order to reduce a change in air-fuel ratio and to prevent or significantly reduce an occurrence of enhanced fluctuations of engine speed during execution of the air-fuel feedback control, a feedback control value for the air-fuel feedback control may be decreasingly changed.

The fuel combustion control system is suitable for the engine equipped with an exhaust line which incorporates the exhaust gas purifying catalyst installed downstream from an exhaust manifold connected to the intake line. Even in the case where the exhaust gas purifying catalyst is put far from an intake manifold and consequently hard to be promptly activated, it is quite effectively carried out to accelerate a rise in catalyst temperature. In other words, because the degree of design freedom of an exhaust system is elevated, the active utilization can be made of, for example, increased air charging efficiency and the inertia of exhaust to cause acceleration of a rise in catalyst temperature during a cold engine start together with a rise in engine output.

BRIEF DESCRIPTION OF THE DRAWINGS

The foregoing and other objects and features of the present invention will be clearly understood from the following detailed description of preferred embodiments when read in conjunction with the accompanying drawings wherein same reference numerals have been used to designate the same or similar parts or elements, and in which:

FIG. 26A is a time chart of a change in engine speed;

FIG. 26B is a time chart of a change in ignition timing;

FIG. 26C is a time chart of a change in air-fuel ratio;

FIG. 26D is a time chart of a change in duty ratio of an idle speed control valve;

FIG. 26E is a time chart of a change in control gain;

FIG. 26F is a time chart of a change in opening of a swirl control valve;

DETAILED DESCRIPTION OF THE PREFERRED EMBODIMENT

Figure 1:
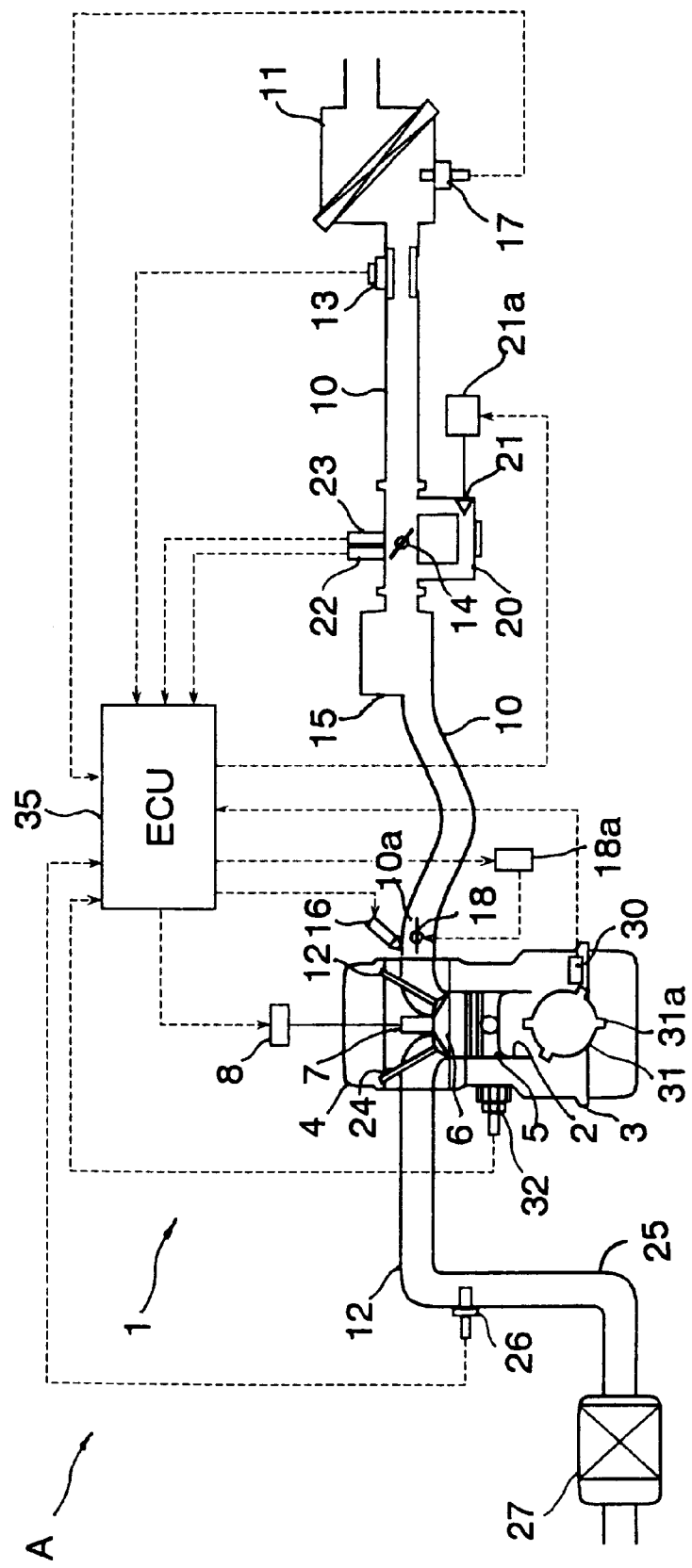
FIG. 1 is a schematic illustration showing the overall structure of an internal combustion engine equipped with an fuel combustion control system in accordance with an embodiment of the invention.

Referring to the drawings in detail and, in particular, to FIG. 1 showing an in-line four cylinder, four-stroke cycle gasoline engine 1 (which is hereafter referred to as an engine for simplicity) equipped with a n engine control system A in accordance with an embodiment of the invention, the engine 1 is comprised of a cylinder block 3 and a cylinder head 4. The cylinder block 3 is provided with four cylinders 2 (only one of which is shown) in which pistons 5 can slide. A combustion chamber 6 is formed in each cylinder 2 by the top of the piston 5, a lower wall of the cylinder head 4 and a wall of the cylinder 2. A spark plug 7, which is installed into the cylinder head 4 at the center with the electrode tip placed down into the combustion chamber 6, is connected to an ignition circuit 8 including an igniter for electronically controlling an ignition timing. An intake valve 12 and an exhaust valve 24 open and shut an intake port and an exhaust port opening into the combustion chamber 6, respectively, at a predetermined timing. An intake passage 10 is connected to the intake port of the combustion chamber 6 at one of its ends and to an air cleaner 11 at another end. The intake passage 11 is provided with a hot-wire type of air flow sensor 13 for detecting an air quantity introduced into the intake passage 10, a throttle valve 14, a surge tank 15 and a fuel injector 16 in order from the upstream end. An electronic control unit (ECU) 35 comprised of a microprocessor provides an injector pulse to open the fuel injector for a time determined by a pulse width of the injector pulse. The air cleaner 11 incorporates a temperature sensor 17 to monitor the temperature of air entering the intake passage 10. The intake passage 10 at its downstream end branches off into a first branch intake passage (which is hidden in the figure) and a second branch intake passage 10a in which an electrically actuated swirl valve 18 is installed. The swirl valve 18 is actuated and dictated by an actuator 18a such as a stepping motor to open and close. When the swirl valve 18 closes, the branch intake passage 18a is almost completely shut to cause an intake air stream to flow into the combustion chamber 6 through the first branch intake passage only so as thereby to produce a swirl in the combustion chamber 6. A bypass intake passage 20, which is essentially used for idle speed control, is connected to the intake passage 10 to allow an intake air stream to flow bypassing the throttle valve 14 and incorporates an idle speed control valve 21. Changing a point of opening of the idle speed control valve 21 controls an intake air quantity flowing through the bypass intake passage 20 to control an engine speed during idling. The throttle valve 14 is provided with an idle switch 22 to detect that the engine is idling and a throttle position sensor 23 to monitor a point of opening of the throttle valve 14.

An exhaust passage 25 at its upstream end is formed with an exhaust manifold branching off into four exhaust passages, each of which is connected to the exhaust port of the combustion chamber 6. The exhaust passage 25 is provided with an oxygen ($O_2$) sensor 26 downstream from the exhaust manifold to monitor an air-fuel ratio within the combustion chamber 6 and a catalytic converter 27 disposed downstream from the $O_2$ sensor 26. The air fuel ratio is dictated by the oxygen concentration in exhaust gas detected by the $O_2$ sensor 26. An output from the $O_2$ sensor 26 sharply fluctuations on opposite sides of an air-fuel ratio for a stoichiometric air-fuel mixture. The catalytic converter 27 has a three way catalyst capable of lowering an emission level of unburnt hydrocarbons (HC), carbon monoxide (CO) and oxides of nitrogen (NOx) and is desirable to lower an emission level of oxides of nitrogen (NOx) even when a lean mixture is burnt.

A crankangle sensor 30 comprising one of electromagnetic pick-up devices is provided to detect an angle of rotation of a crankshaft (not shown) of the engine 1 by which an engine speed is dictated. The crankangle sensor 30 cooperates with a disk 31 secured to an end of the crankshaft. The disk 31 has a plurality of radial projections 31a arranged at regular angular intervals. The crankangle sensor 30 detects the radial projections and provides pulse signals. Further, a temperature sensor 32 is provided to monitor a cooling water temperature Tcw.

Figure 2:
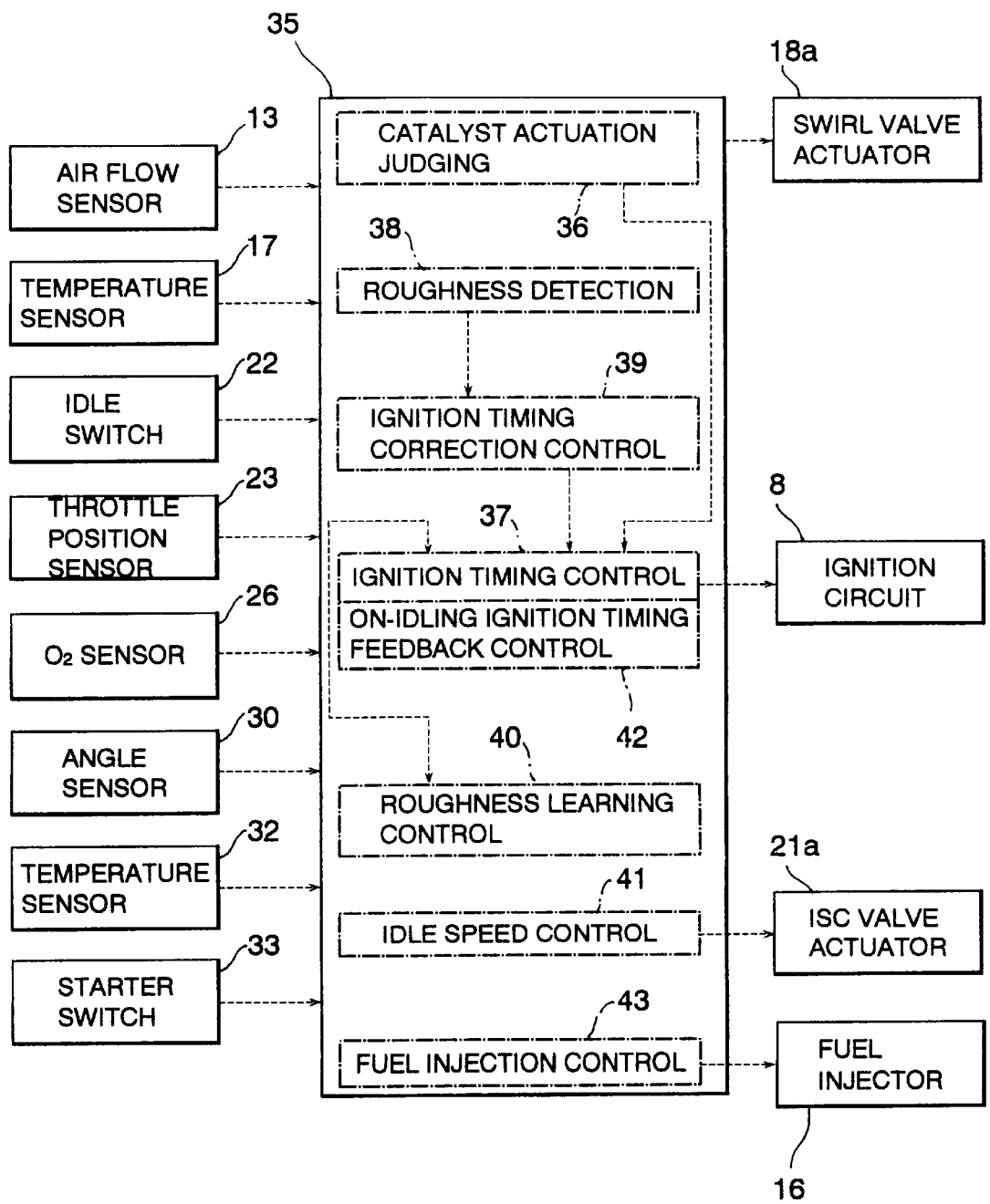
FIG. 2 is a schematic block diagram showing an engine control unit incorporated in the fuel combustion control system.

As shown in FIG. 2, the ECU 35 receives signals from various sensors and switches including the air flow sensor 13, the intake air temperature sensor 17, the idle switch 22, the throttle position sensor 23, the $O_2$ sensor 26, the crankangle sensor 30, the water temperature sensor 32 and a starter switch 33 and provides control signals including an injector pulse to the fuel injector 16, an ignition signal to the ignition circuit 8, actuator signals to the actuators 18a and 21a of the swirl valve 18 and the idle speed control valve 21, respectively. The ECU 35 governs ignition timing retarding control in which an ignition timing is retarded as close to a limit on necessary combustion stability as possible to provide the greatest effect of rising a catalyst temperature with keeping combustion stability of the engine 1. Specifically, the ECU 35 has functional block (catalyst activation judging block) 36 for judging whether the catalyst of the catalytic converter 27 has been warmed up and suitably activated based on a lapse of time from an engine start and cooling water temperature, a functional block (ignition timing control block) 37 for retarding an ignition timing to accelerate a rise in catalyst temperature after activation of the catalyst, a functional block (roughness detection block) 38 for detecting a fluctuation in crankangular velocity, a functional block (ignition timing correction control block) 39 for correcting the ignition timing determined at the ignition timing control block 37 to keep the fluctuation in crankangular velocity within limits on necessary combustion stability, a functional block (roughness learning control block) 40 for learning a correction value for a roughness correction to reflect the correction value on its initial value, a functional block (idle speed control block) 41 for controlling the idle speed control valve 21 to provide an increase in intake air quantity introduced into the engine with which stability of rotation of the engine 1 is improved, and a functional block (on-idle ignition timing feedback control block) 42 for feedforward controlling an idle speed by adjusting an ignition timing. The ECU 35 further has a functional block (fuel injection control block) 43 for governing fuel injection control in which the fuel injection quantity is changed so as to maintain an air-fuel mixture leaner than a stoichiometric mixture having a theoretical air-fuel ratio of 14.7 during execution of acceleration of an increase in catalyst temperature. The fuel injection control yields a rise in exhaust gas temperature and lowers the emission level of hydrocarbons (HC) and carbon monoxide (CO).

Figure 3:
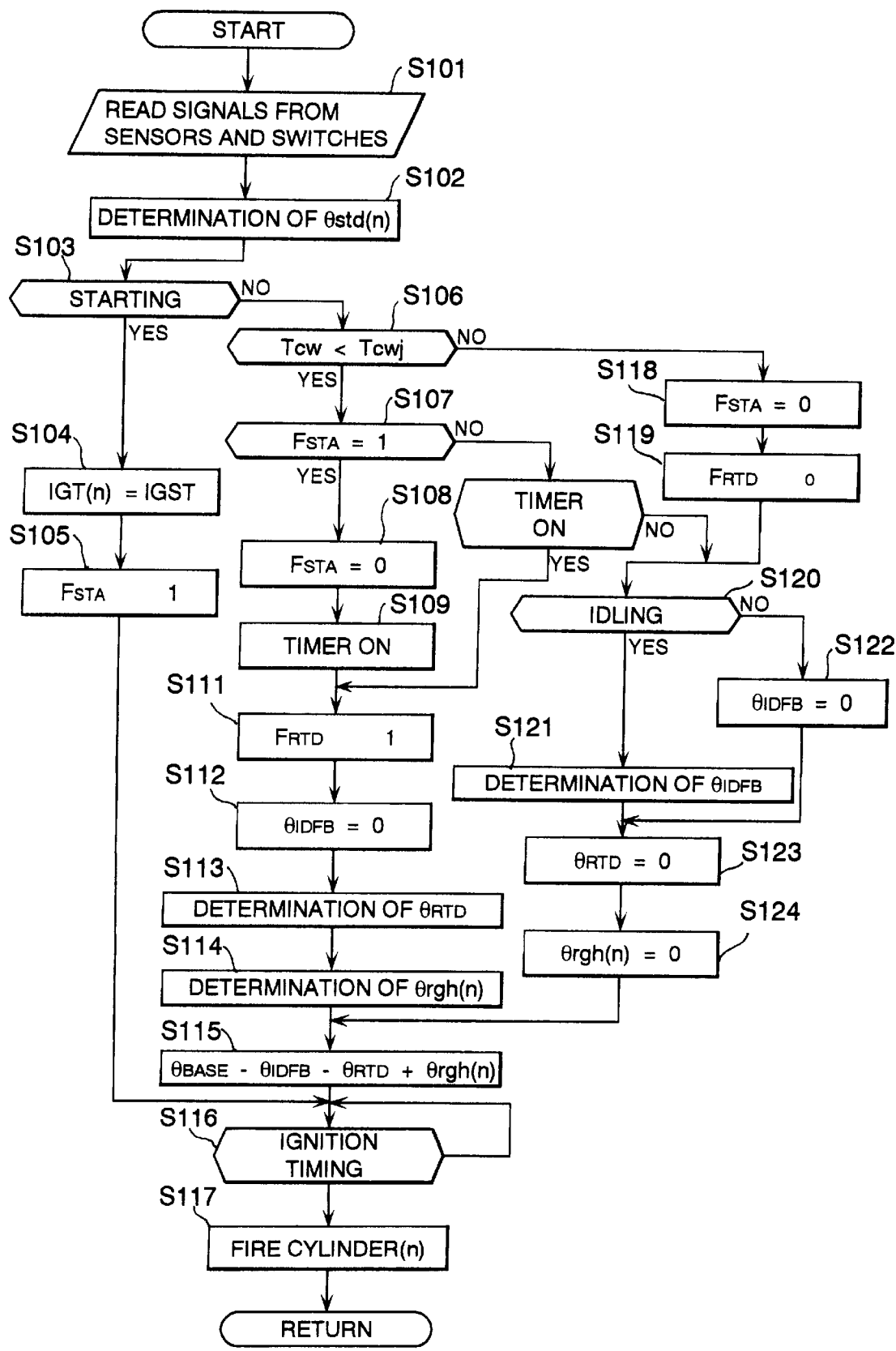
FIG. 3 is a flow chart illustrating a sequence routine of ignition timing control for a microprocessor of the engine control unit of FIG. 2.

FIG. 3 is a flow chart illustrating a sequence routine of the ignition timing control for the microprocessor of the ECU 35.

As shown, the flow chart logic commences and control proceeds directly to a function block at step S101 where the ECU 35 reads signals from the sensors and switches including the air flow sensor 13, the intake air temperature sensor 17, the idle switch 22, the throttle position sensor 23, the $O_2$ sensor 26, the crankangle sensor 30, the water temperature sensor 32 and a starter switch 33 (see FIG. 2). Subsequently, at step S102, a roughness learning value $\theta_{std}(n)$ relating to a roughness control value for each cylinder 2 is read out from a nonvolatile storage. The suffix (n) designates cylinder numbers of first to fourth cylinders. Specifically, the cylinder numbers 1, 2, 3 and 4 designate first, third, fourth and second cylinders, respectively. At step S103, a judgement is made as to whether the engine 1 is starting. When there is no signal from the starter with which a starter motor is actuated or an engine speed is lower than a specified rate, the engine is judged to be not starting. When the engine is starting, an ignition timing IGST during engine starting is taken as an ignition timing IGT(n) at step S104, and a start flag F$_{STA}$ is set up to a state of "1" which indicates that the engine is starting at step S105. When the ignition timing IGT(n) for each cylinder has come at step S116, the spark plug 7 of the cylinder is actuated to fire at step S117.

On the other hand, when the engine is not starting, a judgement is made at step S106 as to whether an cooling water temperature Tcw is lower than a specified point Tcwj, for example 60° C. When the cooling water temperature Tcw is lower than the specified point Tcwo, (60° C.), this indicates that the engine is still cold and hence the catalyst is not yet activated, then, another judgement is made at step S107 as to whether the start flag F$_{STA}$ is up to the state of "1." When it is up, after resetting down the start flag F$_{STA}$ at step S108, a timer is actuated to count a specified heating time Tht for which a rise in catalyst temperature is accelerated at step S109. When the start flag F$_{STA}$ is down, a judgement is made at step S110 as to whether the timer has been actuated and is counting down the heating time Tht. When the timer has been actuated and is counting the heating time Tht, the catalyst of the catalytic converter 27 is judged to be under warming-up, then, an ignition timing IGT(n) is determined through steps S111 to S115.

After setting up a temperature rising flag F$_{RTD}$ to a state of "1" which indicates that a rise in catalyst temperature Tcat is under acceleration by retarding an ignition timing at step S111, a feedback control value $\theta_{IDFB}$ for an ignition timing necessary to keep an idling engine speed Nid remain constant is set to 0 (zero) at step S112 and an ignition timing retard control value $\theta_{RTD}$ for ignition timing retardation is read on an ignition timing retardation control map at step S113. Setting the feedback control value $\theta_{IDFB}$ to 0 (zero) meas to interrupt the on-idle ignition timing feedback control. The ignition timing retardation control map specified air charging efficiency with respect to engine loading and ignition timing retard control value $\theta_{RTD}$ with respect to engine speed. The air charging efficiency is determined by dividing the quantity of intake air detected by the air flow sensor 13 by an engine speed and multiplying the quotient and a specific fixed number together. At step S114, a calculation is made to obtain a roughness control value $\theta_{rgh}(n)$ for each cylinder which is used to correct an ignition timing so as to put fluctuations of crankangular velocity within limits on necessary combustion stability and will be described later. Subsequently, at step S115, an ignition timing IGT(n) is determined as follows:

$$IGT(n) = \theta_{BASE} - \theta_{IDFB} - \theta_{RTD} + \theta_{rgh(n)}$$

where $\theta_{BASE}$ is a basic ignition timing expressed by angle which is ordinarily slightly retarded from a specified ignition timing, for example 10° before top dead center, at which the engine 1 produces maximum torque in each cylinder and corresponds to engine speed and air charging efficiency.

When it is judged at step S116 that the ignition timing IGT(n) calculated at step S104 or S115 has come, the spark plug 7 of the cylinder is actuated to fire at step S117.

As apparent from the above description, for a period of time until the heating time Tht has passed after a cold start of the engine 1, while the ignition timing is retarded to rise the temperature of exhaust gas so as thereby to accelerate a rise in catalyst temperature, the ignition timing is corrected according to a fluctuation of crankangular velocity to control the engine 1 within limits on necessary combustion stability.

On the other hand, when the cooling water temperature Tcw is higher than the specified point Tcwo, namely 60° C., this indicates that the engine has been warmed up and hence the catalyst has been activated, then, after resetting down the start flag F$_{STA}$ and the temperature rising flag F$_{RTD}$ at step S118 and S119, respectively, a judgement is made at step S120 as to whether the engine 1 is idling. This judgement id made based on a signal from the idle switch 22. During idling, the idle switch 22 detects a closed position of the throttle valve 14 and providing a signal representing that the engine is idling. When the engine 1 is idling, a feedback control value $\theta_{IDFB}$ is read from a control map. This map specifies feedback control values $\theta_{IDFB}$ with respect to differences between engine speed and idle speed. When the engine 1 is not idling, the feedback control value $\theta_{IDFB}$ is set to 0 (zero) at step S122. After the determination of feedback control value $\theta_{IDFB}$ at step S121 or at step S122, both ignition timing retard control value $\theta_{RTD}$ and roughness control value $\theta_{rgh}(n)$ are set to 0 (zero) at steps S123 and S124, respectively. Subsequently, through steps S115 to S117, an ignition timing IGT is calculated, and the spark plug 7 of a cylinder is actuated to fire at the ignition timing. That is, when the cooling water temperature Tcw is higher than the specified point Tcwo or when the heating time Tht has passed from an engine start, the ignition timing control for acceleration of a rise in catalyst temperature is terminated through steps S123 and S124 and the ordinary ignition timing control takes place. When the throttle valve 14 is fully closed, the on-idle ignition timing feedback control is performed to regulate an ignition timing so as to keep an engine speed suitable for idling through steps 120 and S121. In this manner, the on-idle ignition timing feedback control is performed with favorable responsiveness by controlling an idle speed through regulation of an ignition timing.

Figure 4:
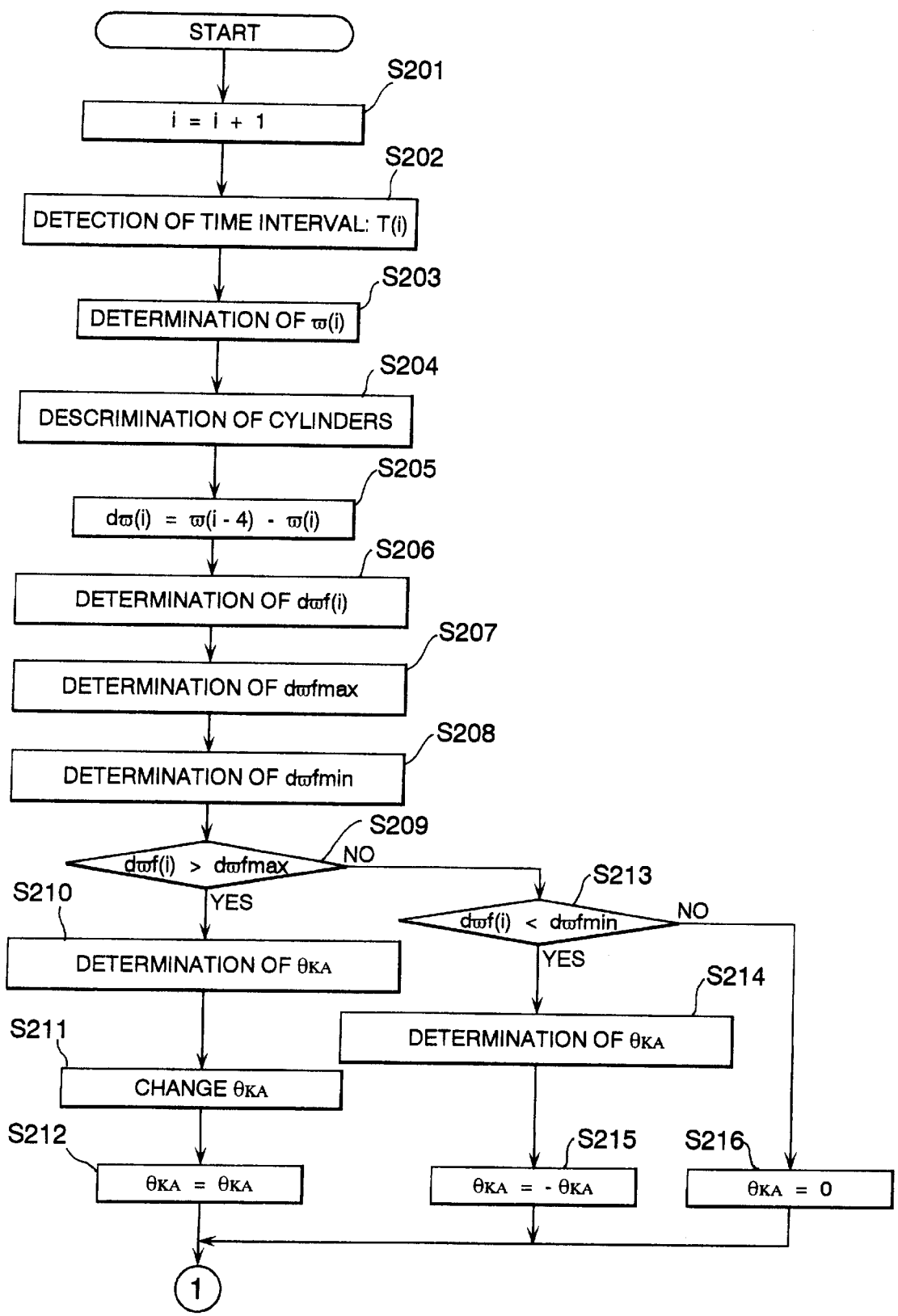
FIGS. 4 and 5 are a flow chart illustrating a sequence routine of roughness control gain setting for a microprocessor of the engine control unit of FIG. 2.
Figure 5:
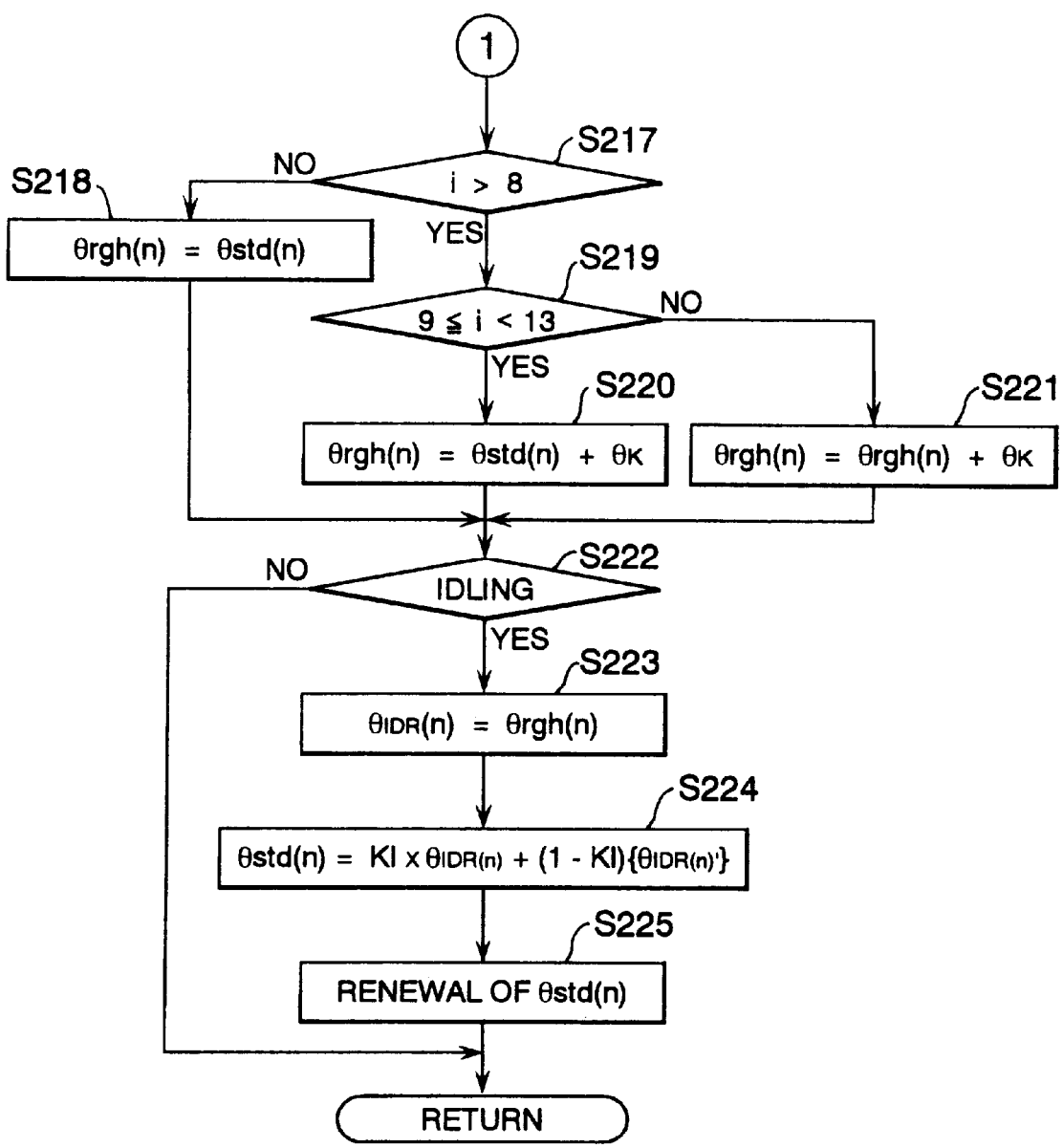

FIGS. 4 and 5 are a flow chart illustrating a sequence routine of the control of determining a roughness control value $\theta_{rgh}(n)$ made at step S114 of the ignition timing control shown in FIG. 3.

As shown, the flow chart logic commences and control proceeds directly to a function block at step S201 where a control cycle, whose initial value is 1 (one), is incremented by one. Subsequently, a time interval T(i) between adjacent signals from the crankangle sensor 30 is measured at step S202, and a crankangular velocity $\omega(i)$ of a specified period of time is calculated based on the time interval T(i) at step S203. The period of time within which a crankshaft angular velocity is calculated is determined as described below.

Figure 6:
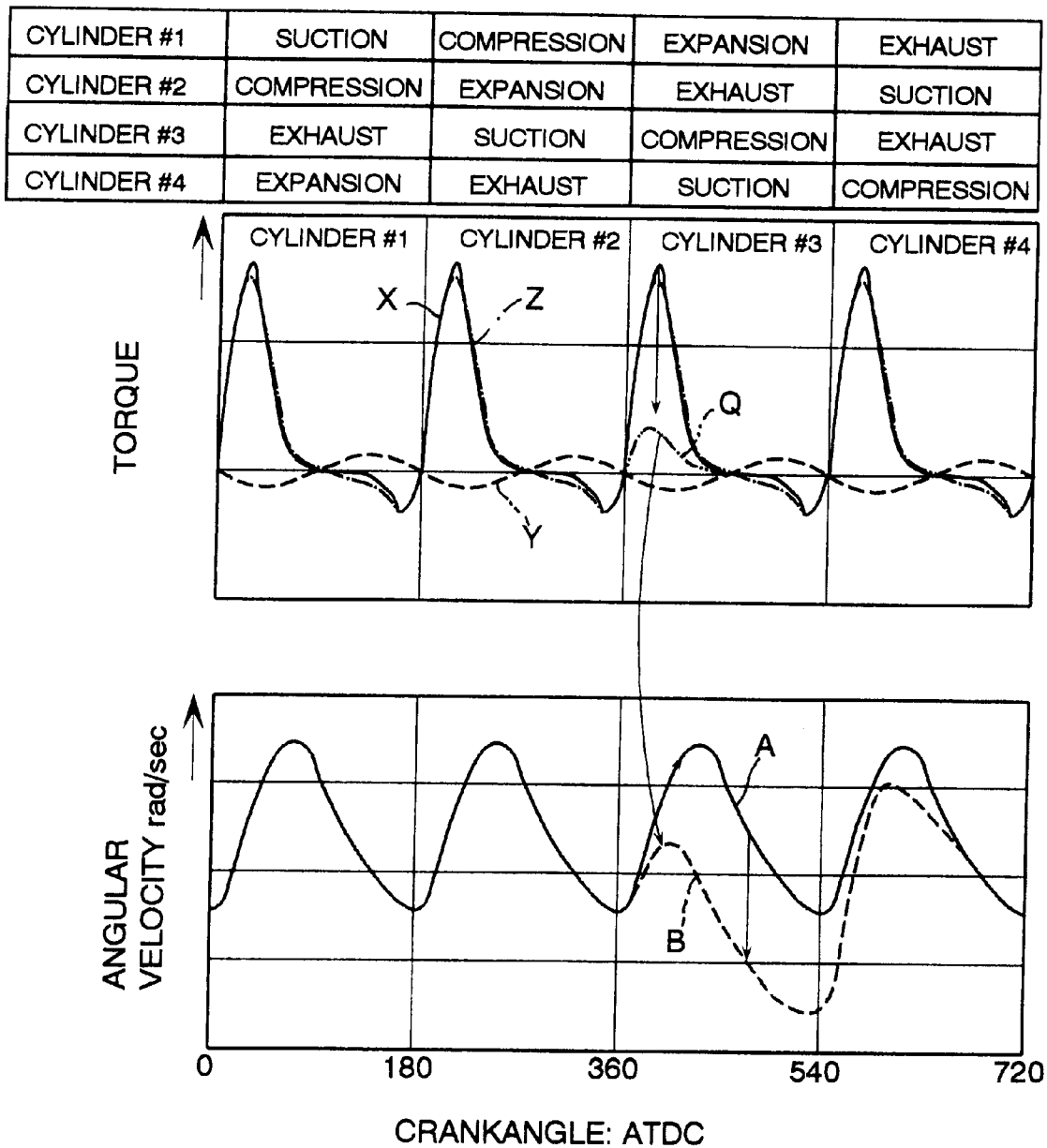
FIG. 6A is a table of strokes of each cylinder of a four-stroke cycle, four cylinder engine.
FIG. 6B is a graphical diagram showing fluctuations of torque relative to fluctuations of crankangle.
FIG. 6C is a graphical diagram showing fluctuations of crankangular velocity relative to fluctuations of crankangle.

FIG. 6 shows engine torque and angular velocity with respect to crankangle in connection with an in-line four-cylinder, four-stroke cycle engine. Relating to each cylinder 2, Resultant torque (shown by solid line X) of torque of inertia (shown by a broken line Y) and torque of gas pressure (shown by a dotted broken line Z) changes periodically at angular intervals of 180° during normal combustion and an angular velocity (indicated by a label "A") of the crankshaft rotated by the resultant torque fluctuations periodically. On the other hand, there occurs the state where fuel combustion in, for example, the number 1 cylinder 2 becomes as unstable as a semi-misfire occurs, the resultant torque exceedingly drops as shown by a double-dotted broken line Q. As a result, a crankangular velocity significantly drops from the middle of an expansion stroke as shown by a broken line B, a difference of the crankangular velocity during unstable combustion from that during normal combustion is expanded. In connection with the number 3 cylinder next to the number 1 cylinder 2, although the crankangular velocity lowers at the middle of an expansion stroke due to an effect of the preceding cylinder, namely the number 1 cylinder in this embodiment, it reaches gradually a crankangular velocity for normal combustion with progress of the expansion.

Figure 7:
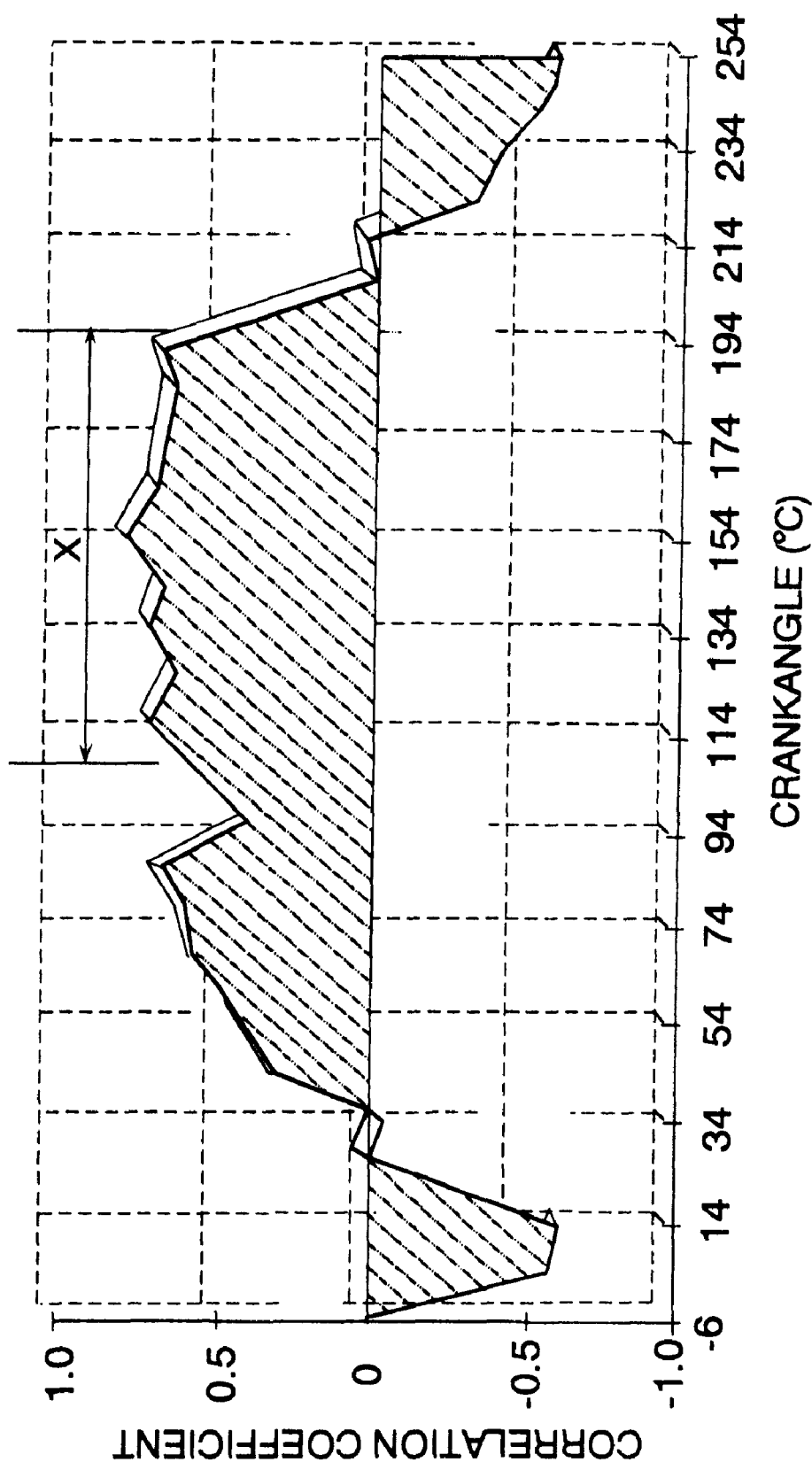
FIG. 7 is a graphical diagram showing the relationship between combustion pressure and fluctuations of crankangular velocity.

FIG. 7 shows combustion gas pressure represented by a correlation coefficient relative to a fluctuation in crankangular velocity after top dead center of a compression stroke of a specific cylinder. Correlation coefficient is a measurement of how the gas pressure relating a specific cylinder has an effect on crankangular velocity. A plus value of correlation coefficient indicates that a change in gas pressure of the specific cylinder has strong correlation to the fluctuation in crankangular velocity of the specific cylinder, and a minus value of correlation coefficient indicates that a change in gas pressure of a preceding cylinder has strong correlation to the fluctuation in crankangular velocity of the specific cylinder.

As apparent from FIGS. 6 and 7, the correlation between combustion gas pressure and a fluctuation in crankangular velocity is strong between a crankangle at which combustion is almost completed (approximately 40° ATDC) and a crankangle at which the following cylinder almost starts fuel combustion (approximately 200° ATDC) and it is significantly strong in particular in a period X where inertial torque is increased, i.e. between crankangles 100 and 200° ATDC) after an inflection point of gas pressure torque (at a crankangle of 90° ATDC). Accordingly, a combustion state of a specific cylinder is precisely determined on the basis of fluctuations of crankangular velocity of the specific cylinder by detecting a crankangular velocity within an extent between crankangles of, for example, 100 and 200°. In order to provide a long allowable time for crankangle detection, it is desirable to make crankangle detection after a crankangle of 60°.

Figure 8:
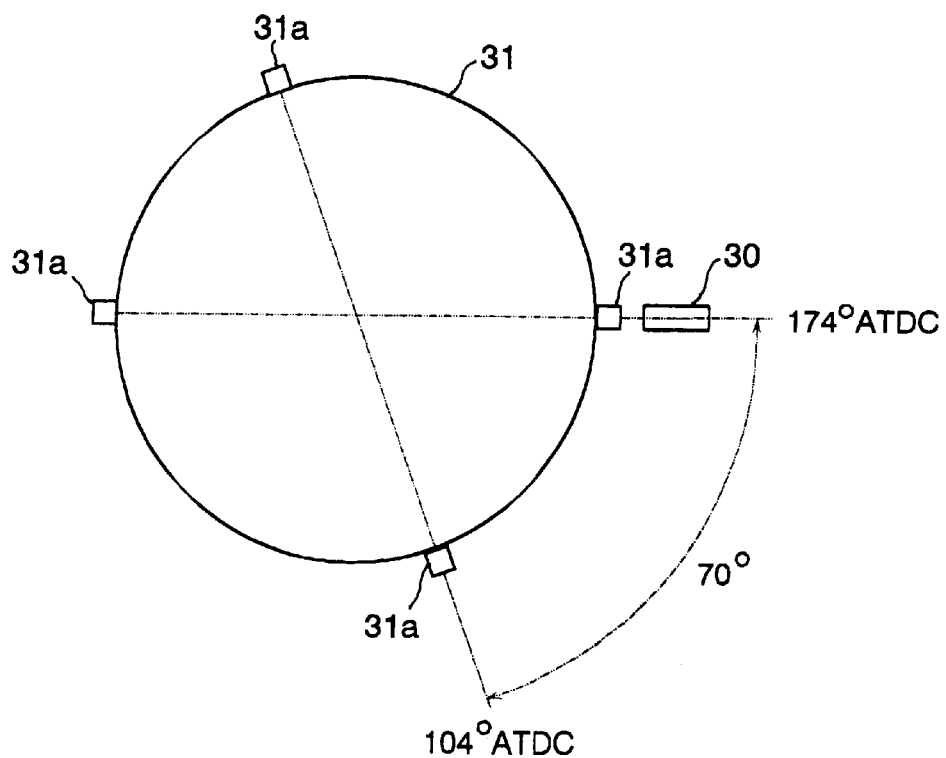
FIG. 8 is a schematic illustration showing a structure of a crankangle sensor and a detected plate.

In view of the above circumstances, as shown in FIG. 8, the detected plate 31 is formed with the radial projections 31a at angular intervals such that the radial projection is detected at crankangles of 104° ATDC and 174° ATDC of each cylinder to find a crankangular velocity during a rotation of the crankshaft through 70° from a crankangle of 104° ATDC to a crankangle of 174° ATDC. Therefore, the following expression is used to calculate a crankangle velocity ω of a specific cylinder (i) at step S203.

$$\omega(i) = 70 \times 10^{-6}/T(i)$$

Figure 9:
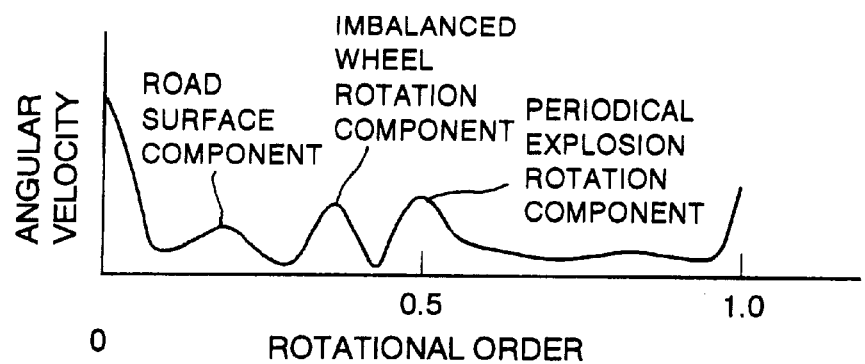
FIG. 9 is a graphical diagram showing fluctuations of crankangular velocity relative to crankangle due to noise factors.

Thereafter, after discriminating cylinders based on signals provided by a sensor (not shown) for monitoring a rotational angle of a camshaft (not shown) at step S204, a fluctuation in crankangular velocity dωf(i) is determined removing factors which are noises to determination of a combustion state of each cylinder through steps S205 and S206. There are factors, excepting a change in combustion state, which cause a fluctuation of crankangular velocity ω(i) such as resonance due to explosive fuel combustion, imbalanced rotation of wheels, vibrations due to road surface conditions transmitted through wheels and the like. As shown in FIG. 9, components of crankangular velocity fluctuations resulting from explosive rotation as noises due to the resonance occur in a frequency of rotational orders of 0.5 and its integral multiples. However, components of crankangular velocity fluctuations as noises due to imbalanced wheel rotation and road surface conditions occur in a frequency band of rotational orders less than 0.5.

Figure 10:
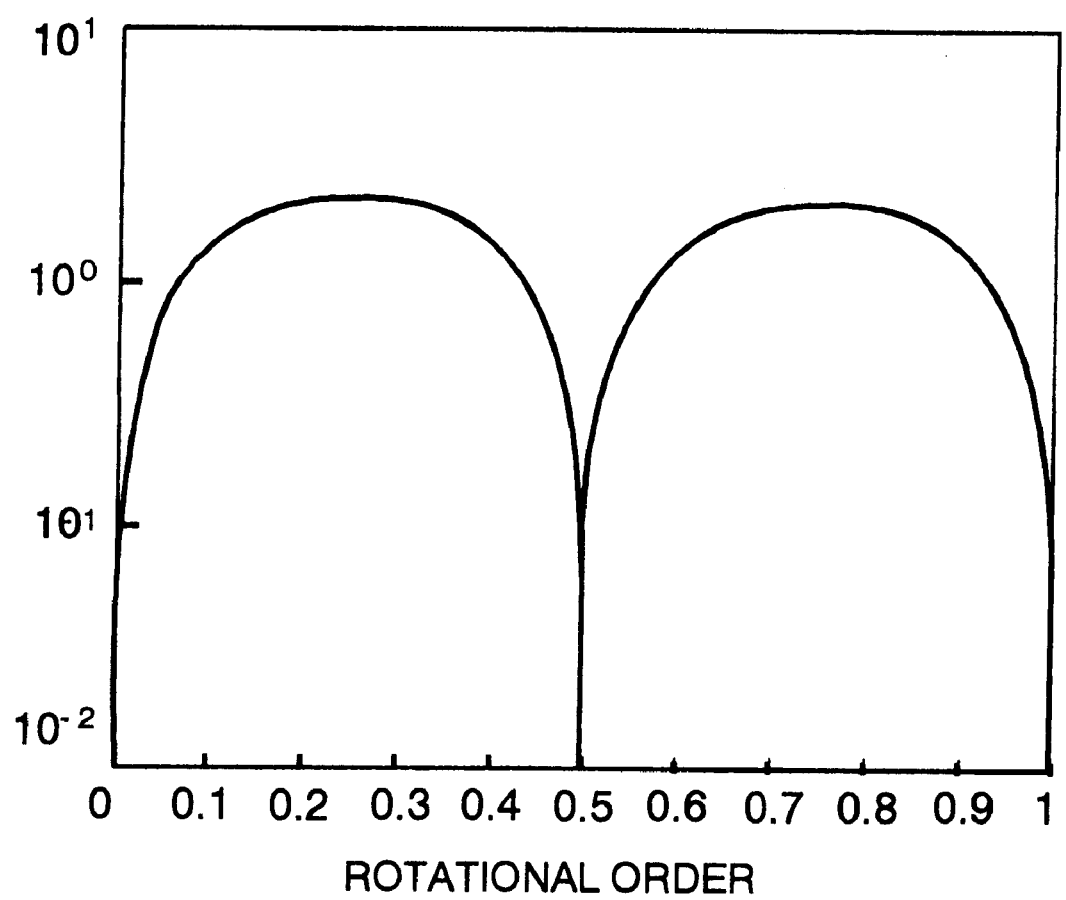
FIG. 10 is a graphical diagram showing fluctuations of crankangular velocity after processing data of crankangular velocity from which components of crankangular velocity fluctuations resulting from noises occurring in a frequency of rotational orders of 0.5 and its integral multiples are removed.

At step S205, a crankangular velocity fluctuation dω(i) is determined removing frequency components of crankangular velocity fluctuations occurring in a frequency of rotational orders of 0.5 and its integral multiples. That is, by determining a deflection of a current crankangular velocity ω(i) from the previous crankangular velocity ω(i−4) (four stroke before) for a specific cylinder, a crankangular velocity fluctuation dω(i), in which crankangular velocity fluctuations occurring in a frequency of rotation orders of 0.5 and its integral multiples are removed, is obtained as shown in FIG. 10. Further, in order to remove components of crankangular velocity fluctuations as noises occur in a frequency band of rotational orders less than 0.5, tempering processing is made by the use of crankangular velocity fluctuations dω(i) obtained for the last eight cycles. The tempered crankangular velocity fluctuation dωf(i) is determined as follows:

$$d\omega f(i) = a \times d\omega(i) + b \times d\omega(i-1) + c \times d\omega(i-2) + d \times d\omega(i-3) + e \times d\omega(i-4) + d \times d\omega(i-5) + c \times d\omega(i-6) + b \times d\omega(i-7) + a \times d\omega(i-8)$$

where a–d are tempering factors.

Figure 11:
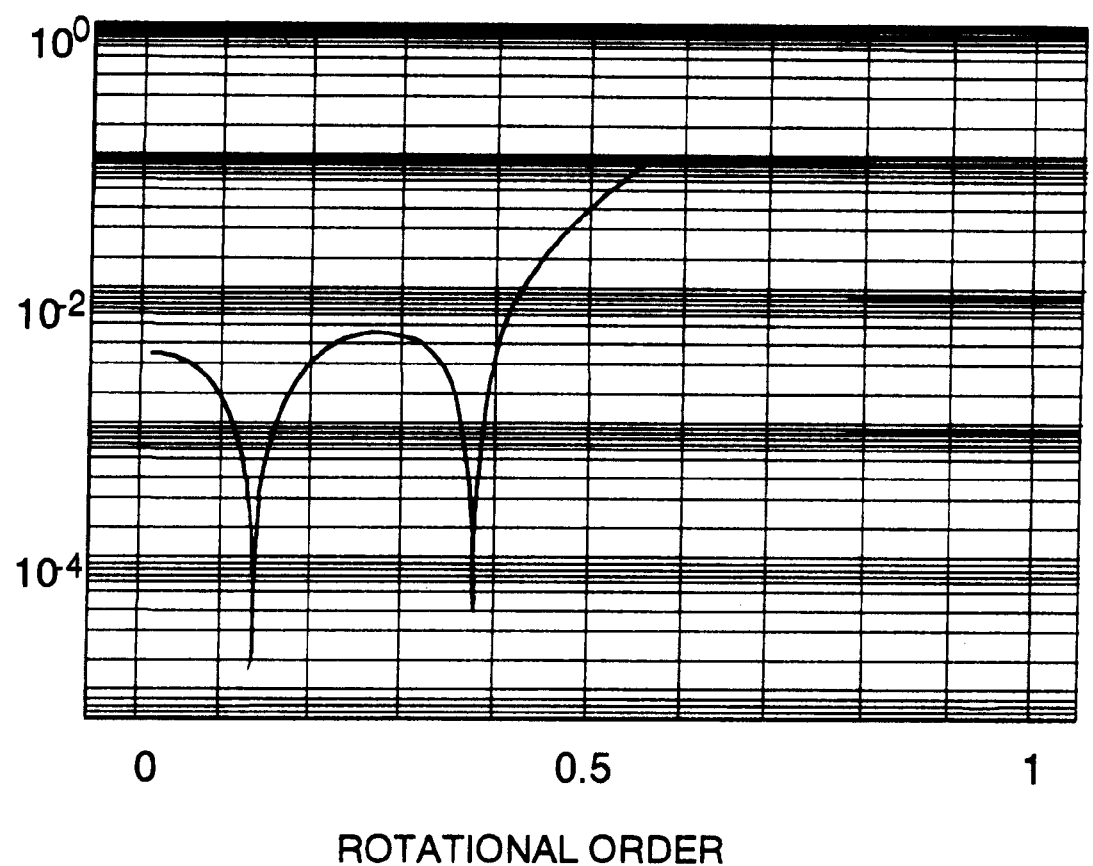
FIG. 11 is a graphical diagram showing fluctuations of crankangular velocity after processing data of crankangular velocity from which components of crankangular velocity fluctuations resulting from noises occurring in a frequency of rotational smaller than an order of 0.5.

As a result of the tempering processing, as shown in FIG. 11, components of crankangular velocity fluctuations occurring in a frequency band of rotational orders less than 0.5 are satisfactorily removed. In this manner, a crankangular velocity fluctuation dωf(i) of each cylinder on which a combustion state is precisely reflected are obtained.

Subsequently, allowable upper and lower limit fluctuations of crankangular velocity dωfmax and dωfmin to combustion stability are determined with reference to crankangular velocity fluctuation control maps at steps S207 and S208, respectively. These maps specify upper and lower limit fluctuations of crankangular velocity dωfmax and dωfmin relative to engine speed and air charging efficiency, respectively. The crankangular velocity fluctuation dωf(i) is compared with the upper limit fluctuation of crankangular velocity dω(fmax at step S209. When the crankangular velocity fluctuation dωf(i) is greater than the upper limit fluctuation of crankangular velocity dωfmax, a control gain $\theta_{KA}$ (which is greater than 0) for increasing the roughness control value $\theta_{rgh}(n)$ is determined by the use of control gain map at step S210. The control gain θKA is corrected according to degrees of fuel heaviness at step S211 and employed as a roughness control gain $\theta_K$ at step S212. On the other hand, when the crankangular velocity fluctuation dωf(i) is less than the upper limit fluctuation of crankangular velocity dωfmax, the crankangular velocity fluctuation dωf(i) is then compared with the lower limit fluctuation of crankangular velocity dωfmin at step S213. When the crankangular velocity fluctuation dωf(i) is less than the lower limit fluctuation of crankangular velocity dωfmin, a control gain $\theta_{KR}$ (which is less than 0) for decreasing the roughness control value $\theta_{rgh}(n)$ is determined by the use of the control gain map at step S214, and employed as a roughness control gain $\theta_K$ at step S212. When the crankangular velocity fluctuation dωf(i) is greater than the lower limit fluctuation of crankangular velocity dωfmin, the roughness control gain $\theta_K$ is adjusted to 0 (zero) at step S216.

Subsequently to determination of the roughness control gain $\theta_K$ at step S212, S215 or S216, a judgement is made at step S217 as to whether the number of control cycle $i$ is greater than eight. When the number of control cycle $i$ is equal to or less than eight, a roughness learning value $\theta_{std}(n)$ read out from the nonvolatile storage is employed as a roughness control value $\theta_{rgh}(n)$ at step S218. When the number of control cycle $i$ is greater than eight, another judgement is made at step S219 as to whether the number of control cycle $i$ is equal to or greater than nine but less than 13. When the number of control cycle $i$ is between nine and 13, the roughness learning value $\theta_{std}(n)$ added by the roughness control gain $\theta_K$ is employed as a roughness control value $\theta_{rgh}(n)$ at step S220. On the other hand, when the number of control cycle $i$ is greater than 13, the roughness control value $\theta_{rgh}(n)$ obtained in the last control cycle added by the roughness control gain $\theta_K$ is employed as a roughness control value $\theta_{rgh}(n)$ at step S221. In this instance, during the early stage of the control of a roughness control value, for example, till eighth cycle, the roughness learning value $\theta_{std}(n)$ is directly employed as a roughness control value $\theta_{rgh}(n)$. However, with progress of the control cycles, the ignition timing IGT(n) is advanced when the crankangular velocity fluctuation dωf(i) is greater than the upper limit fluctuation of crankangularvelocity dωfmax and consequently the roughness control gain $\theta_K$ takes a plus value and, on the other hand, the ignition timing IGT(n) is retarded when the crankangular velocity fluctuation dωf(i) is less than the lower limit fluctuation of crankangular velocity dωfmin and consequently the roughness control gain $\theta_K$ takes a minus value.

Subsequently to determination of the roughness control value $\theta_{rgh}(n)$ at step S218, S220 or S221, a judgement is made at step S222 as to whether the engine 1 is idling. When there is a signal from the idling switch 22, this indicates that the throttle valve 14 is in the closed position and the engine is idling, then, after storing the current roughness control value $\theta_{rgh}(n)$ as a preliminary roughness learning value $\theta_{RMIN}(n)$ at step S223, the preliminary roughness learning value $\theta_{RMIN}(n)$ is weighted with the previous preliminary roughness learning value $\theta_{RMIN}'(n)$ at step S224 and stored as a current roughness learning value $\theta_{std}(n)$ in the nonvolatile storage at step S225.

The roughness learning value $\theta_{std}(n)$ is determined as follows:

$$\theta_{std}(n) = KI \times \theta_{IDR}(n) + (1-KI) \times \theta_{IDR}'(n)$$

where KI is the weighing factor.
However, the engine is not idling, the flow chart logic orders return for another cycle of the sequence routine.

The reason why roughness learning value $\theta_{std}(n)$ is weighted that, since it is easy to detect a crankangular velocity fluctuation dωf(i) due to a change in combustion state during cold idling, the roughness control value $\theta_{rgh}(n)$ is well suited according to fuel quality and the like for each cylinder.

Figure 12:
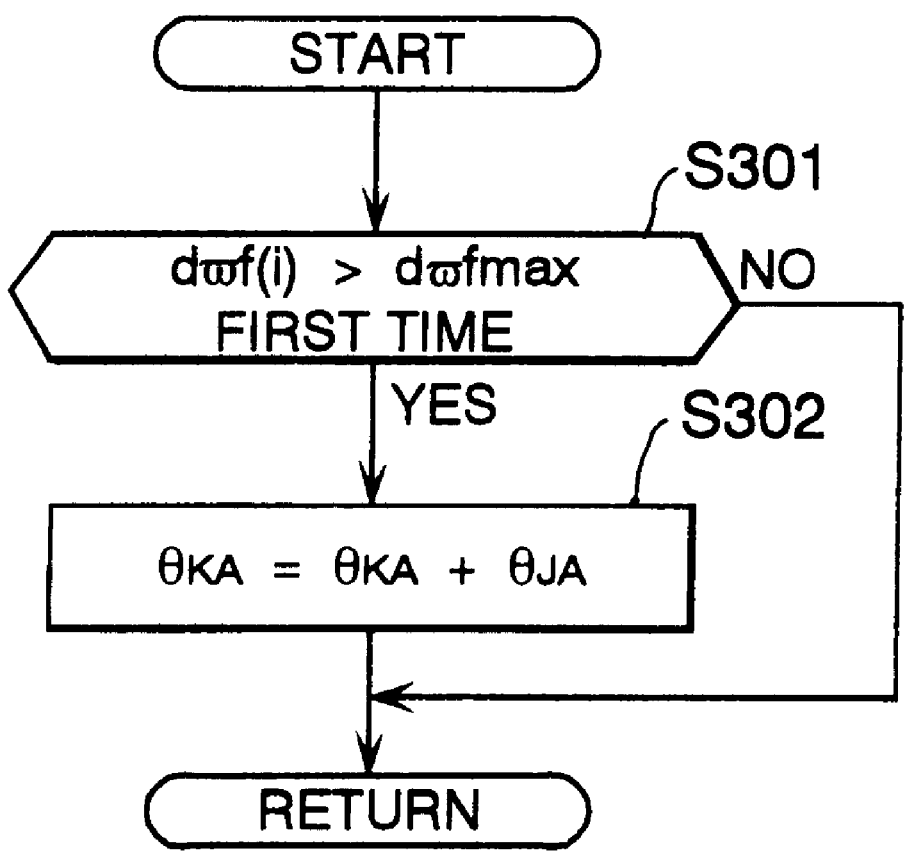
FIG. 12 is a flow chart illustrating a sequence routine of varying a roughness control gain according to fuel heaviness for a microprocessor of the engine control unit of FIG. 2.

FIG. 12 is a flow chart illustrating a sequence routing of changing a control gain $\theta_{KA}$ made at step S211 in the roughness control value $\theta_{rgh}(n)$ determination sequence routine shown in FIGS. 4 and 5.

Figure 13:
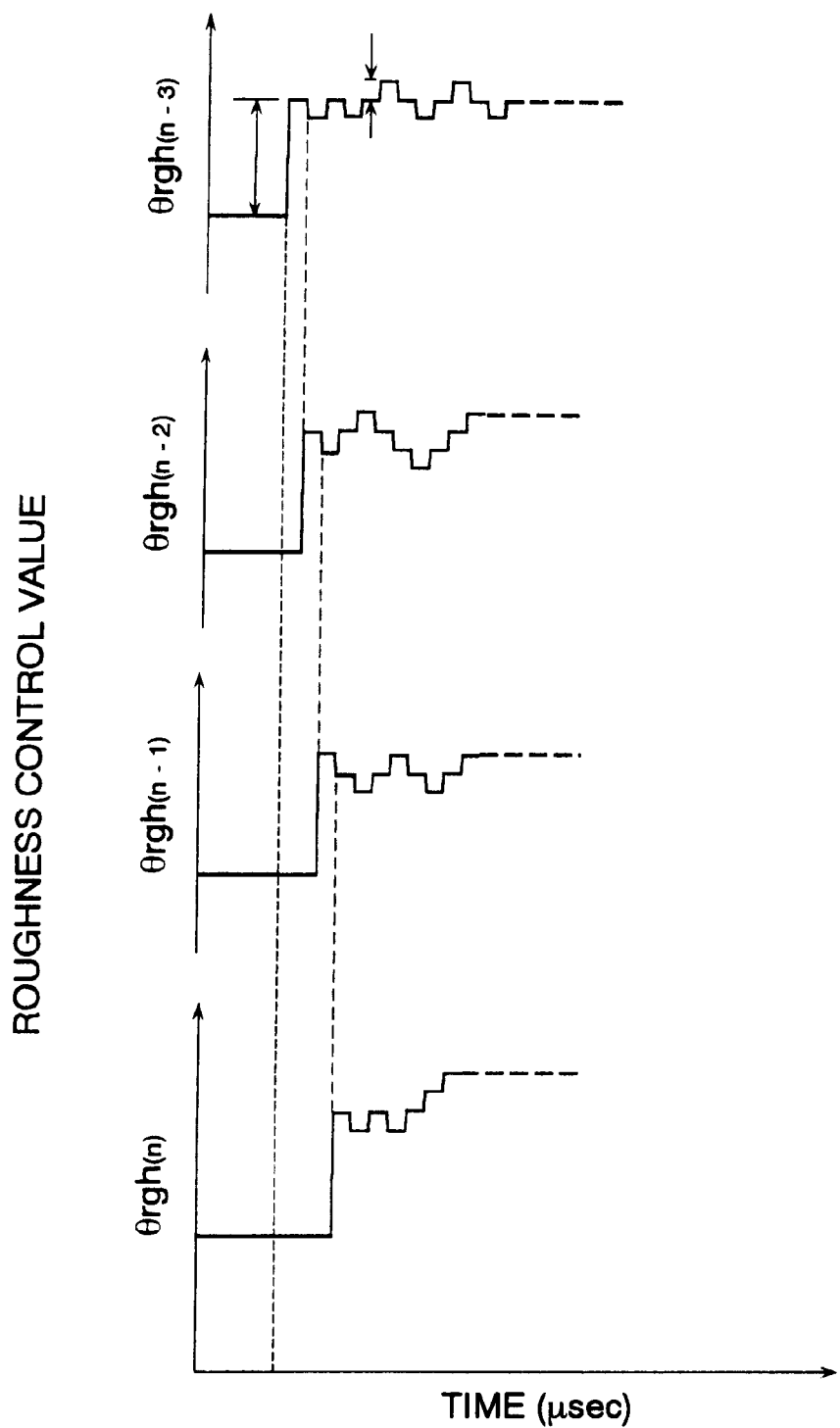
FIGS. 13A–13D are explanatory diagrams showing shifts of roughness control values due to variations of roughness control gain.

As shown, only when the crankangular velocity fluctuation dωf(i) turns greater than the upper limit fluctuation of crankangular velocity dωfmax for the first time at step S301, then, the control gain $\theta_{KA}$ is added by a value $\theta_{JA}$ (which is greater than 0) previously specified according to the degree of fuel heaviness at step S302. As a result of which, the roughness control values $\theta_{rgh}$ for the respective cylinders sharply increase with an effect of quickly advancing the ignition timing IGT as shown in FIG. 13. The control gain $\theta_{KA}$ may be changed greater as the crankangular velocity fluctuation dωf(i) increases, as a result of which, an ignition timing is suitably and quickly corrected according to magnifications of the crankangular velocity fluctuation dωf(i), i.e. the degree of fuel heaviness.

Figure 14:
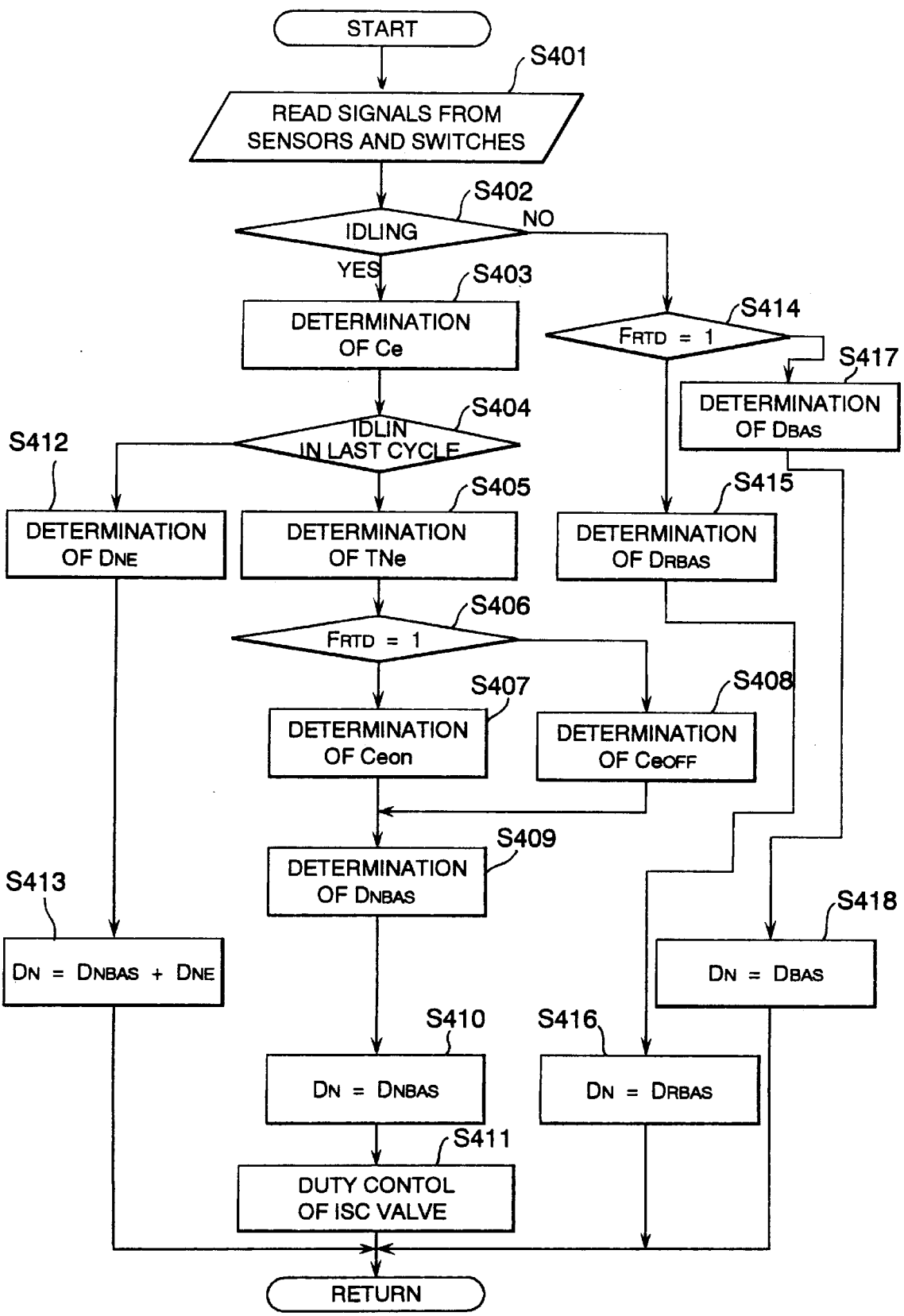
FIG. 14 is a flow chart illustrating a sequence routine of idle speed control for a microprocessor of the engine control unit of FIG. 2.

FIG. 14 is a flow chart which is a sequence routine of the idle speed control performed at the functional block 41 of the ECU 35.

Figure 15:
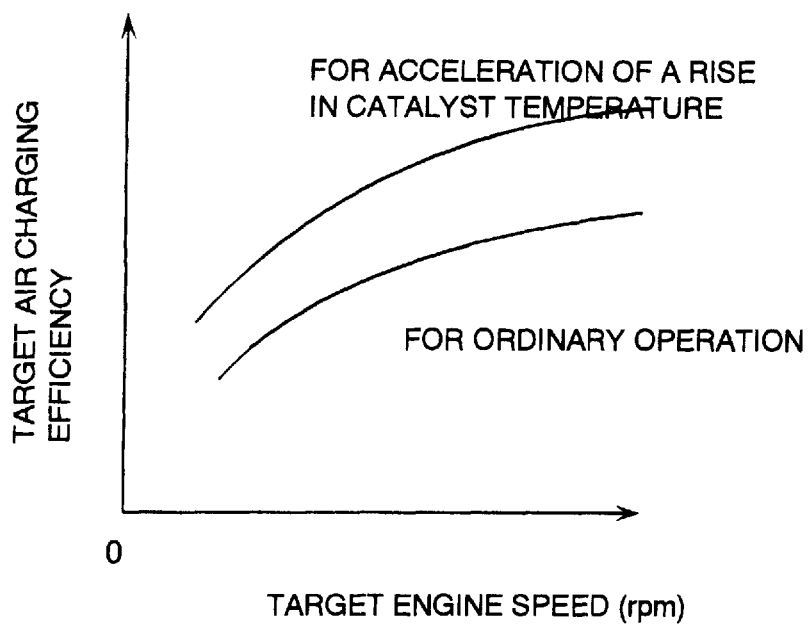
FIG. 15 is an illustration of a target air charging efficiency control map.

When the flow chart logic commences and control proceeds directly to a function block at step S401 where the ECU 35 reads signals from the sensors and switches including at least the air flow sensor 13, the idle switch 22, the crankangle sensor 30, the water temperature sensor 32 and the starter 33. When the engine 1 is currently idling with the throttle valve 14 remaining fully closed at step S402, air charging efficiency Ce is determined based on an air flow rate and an engine speed at step S403. When the engine 1 was not idling during the last control cycle at step S404, after determining a target engine speed TNe as an idle speed based on a current cooling water temperature Tcw with reference to an idle speed control map at step S405, a judgement is subsequently made at step S406 as to whether the temperature rising flag FRTD has been up. When the temperature rising flag FRTD is up, target air charging efficiency TCeon for on-control of acceleration of a rise in catalyst temperature (which is hereafter referred to as an on-idling target air charging efficiency) is determined with reference to a target air charging efficiency control map (shown in FIG. 15) at step S407. On the other hand, when the temperature rising flag FRTD is down at step S406, target air charging efficiency TCeoff for off-control of acceleration of a rise in catalyst temperature (which is hereafter referred to as an off-idling target air charging efficiency) is determined with reference to the air charging efficiency control map at step S408. The air charging efficiency map specifies experimental target air charging efficiency TCe relative to idling engine speeds TNe. On-control target air charging efficiency TCeon is higher than off-control target air charging efficiency TCeoff for each cooling water temperature Tcw. That is, because, while an ignition timing is retarded by execution of the control of acceleration of catalyst temperature rising, a proportion of the thermal energy generated by fuel combustion which is converted into rotation of the crankshaft is lowered and the engine 1 drops its output power consequently. The target air charging efficiency TCeon is increased to a specified level to compensate the drop in engine output power, thereby maintaining a target engine speed even while the on-idle ignition timing feedback control at functional block 42 is interrupted by setting the feedback control value $\theta_{IDFB}$ to 0 (zero) at step S112 of the ignition timing control shown in FIG. 3. At this time, an engine speed is controlled to be higher than the idle speed by increasing the quantity of intake air to stabilize engine rotation.

After the determination of the on-control target air charging efficiency TCeon at step S407 or the off-control target air charging efficiency TCeoff at step S408, a basic value of idle speed control DNBAS meeting an opening of the idle speed control valve 21 necessary to develop the on-control target air charging efficiency TCeon or the off-control target air charging efficiency TCeoff is determined with reference to an idle speed control map at step S409. The idle speed control map specifies openings of the idle speed control valve 21 relative to target air charging efficiencies TCe. Subsequently, at step S410, the basic value of idle speed control DNBAS is employed as a practical value of idle speed control DN.

Figure 16:
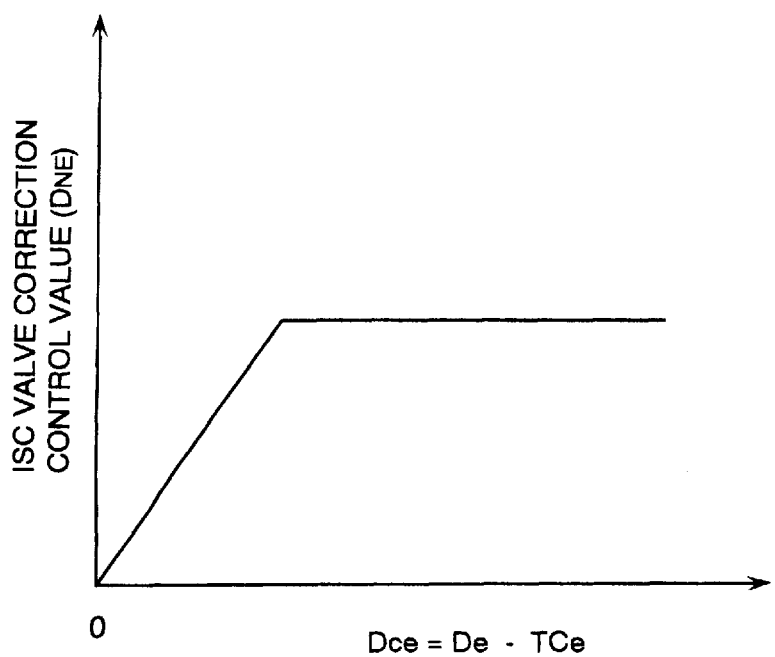
FIG. 16 is an illustration of a idle control valve control map.

When the engine 1 was idling during the last control cycle at step S404, after determining a correction value of idle speed control DNE according to a deflection DCe of current air charging efficiency Ce from the target air charging efficiency TCe with reference to an idle speed correction map (shown in FIG. 16) at step S412, a practical value of idle speed control DN is determined by adding the correction value of idle speed control DNE to the basic value of idle speed control DNBAS at step S413. As shown in FIG. 16, the idle speed correction map specifies correction values of idle speed control DNE relative to air charging efficiency deflections DCe. The correction value of idle speed control DNE is linearly increased with an increase in air charging efficiency deflection DCe in a range of lower air charging efficiency deflections DCe and however fixed for larger air charging efficiency deflection DCe.

Further, when the engine 1 is currently not idling at step S402 and the temperature rising flag FRTD is up at step S414, a basic value of idle speed control DRBAS for on-control of acceleration of a rise in catalyst temperature to retard an ignition timing is determined at step S415 and is, subsequently, employed as a practical value of idle speed control DN at step S416. On the other hand, when, while the engine 1 is currently not idling at step S402, the temperature rising flag FRTD is down at step S414, a basic value of idle speed control DBAS for off-control of acceleration of a rise in catalyst temperature to retard an ignition timing is determined with reference to the idle speed control map at step S417 and is, subsequently, employed as a practical value of idle speed control DN at step S419.

Finally, after the determination of a practical value of idle speed control DN at step S410, S413, S416 or S418, the idle speed control valve 21 is controlled at a duty ratio corresponding to the value of idle speed control DN at step S411. The flow chart logic then orders return for another cycle of the sequence routine.

Figure 17:
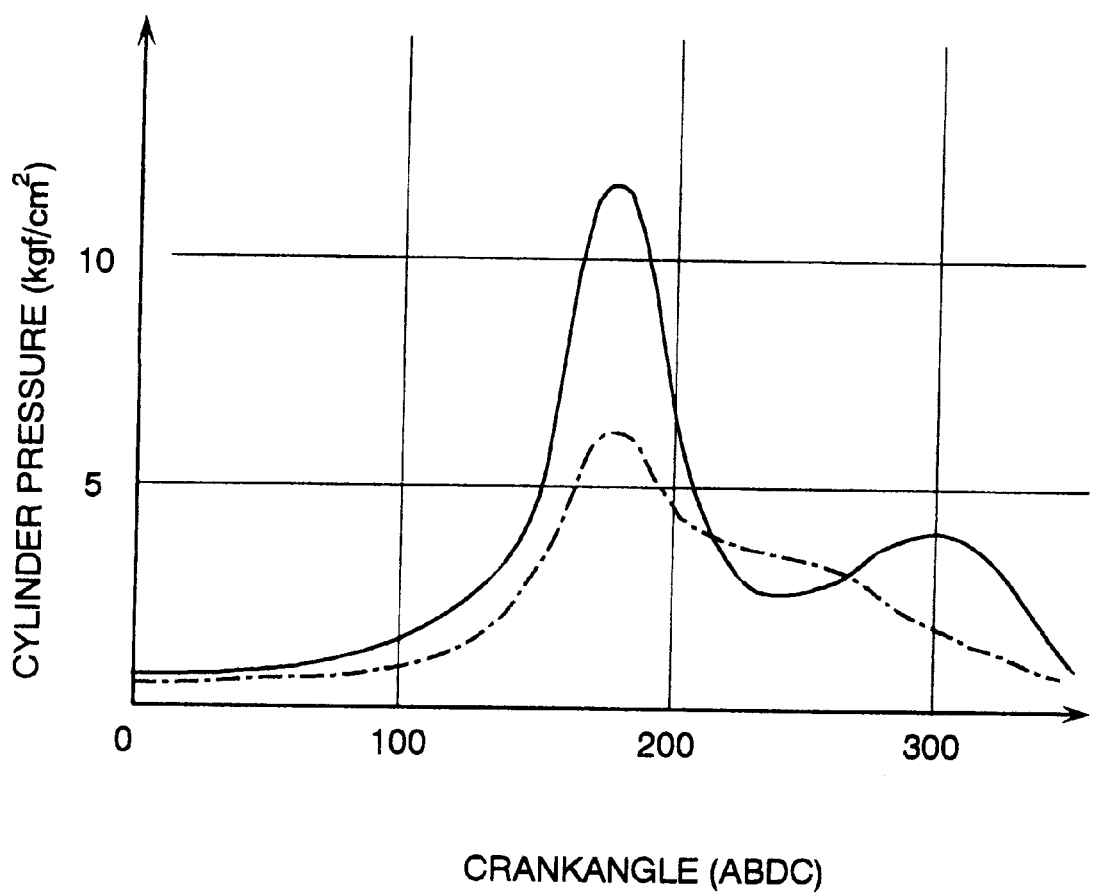
FIG. 17 is a graphical diagram showing cylinder pressure relative to crankangle.

As described above, when it is detected based on a temperature of engine cooling water and a time passed from an engine start that the catalyst is not yet warmed up sufficiently, an ignition timing IGT(n) is retarded to rise the temperature of exhaust gas so as to accelerate a rise in catalyst temperature. As seen in FIG. 17 showing cylinder pressure relative to crankangle after bottom dead center in a suction stroke when a stoichiometric mixture is burnt, when retarding the ignition timing IGT(n) greatly to a crankangle of, for example, 20° ATDC, a peak of fuel combustion of an air-fuel mixture occurs after a considerable drop in cylinder pressure after a middle stage of an expansion stroke as shown by a solid line and, consequently, conversion efficiency of the thermal energy of fuel combustion is considerably low. As a result, The temperature of exhaust gas rises greatly due to a considerably increased exhaust loss. In FIG. 17, cylinder pressure produced when an air-fuel mixture is fired at an ignition timing right at TDC is shown by a dotted line for comparison purpose.

Figure 18:
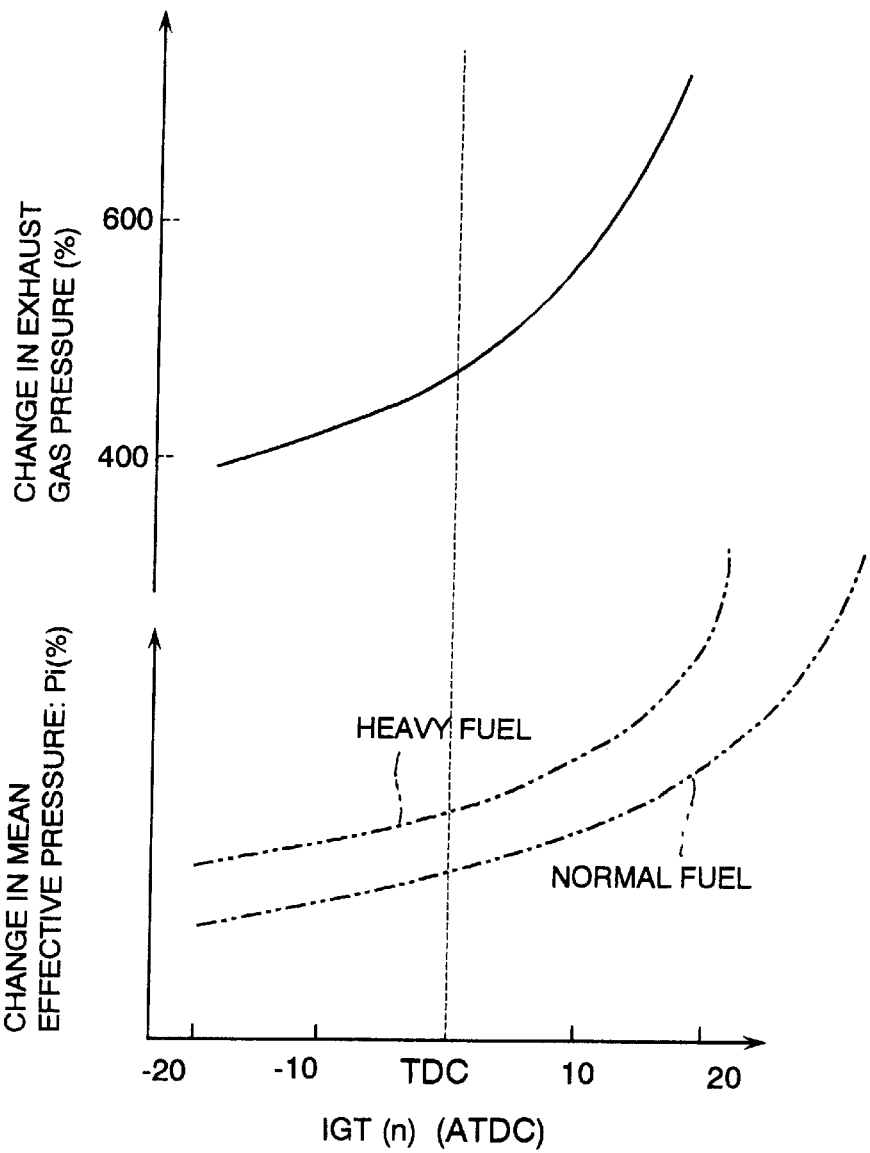
FIG. 18A is a graphical diagram showing exhaust gas temperature relative to ignition timing.
FIG. 18B is a graphical diagram showing mean effective pressure relative to ignition timing.

As shown in FIG. 18A, the exhaust gas temperature rises higher as an ignition timing IGT(n) is retarded, so as to accelerate a rise in catalyst temperature. However, as shown in FIG. 18B, a retard in ignition timing IGT(n) yields an increase in changing rate (%) of mean effective pressure Pi, i.e. a torque changing rate, as a result of which, there occurs aggravation of combustion stability. In particular, the changing rate of mean effective pressure Pi is higher for a heavy fuel than for a normal fuel. Accordingly, a heavy fuel possibly occurs aggravation of combustion stability. However, in the engine control system according to the above embodiment of the invention, the ignition timing IGT(n) is corrected according to crankangular velocity fluctuations dωf(i). That is, the ignition timing IGT(n) is advanced by increasing the roughness control value $\theta_{rgh}(n)$ when the crankangular velocity fluctuation dωf(i) is greater than the upper limit fluctuation of crankangular velocity dωfmax, so as to control fuel combustion a little stable. On the other hand, the ignition timing IGT(n) is retarded by reducing the roughness control value $\theta_{rgh}(n)$ when the crankangular velocity fluctuation dωf(i) is less than the lower limit fluctuation of crankangular velocity dωfmin due to allowance for combustion stability, so as to enhance acceleration of a rise in catalyst temperature. Accordingly, since an actual combustion state is precisely judged on the basis of crankangular velocity fluctuations dωfmin, even if ignitability and combustibility of a fuel is changed due to deterioration, acceleration of a rise in catalyst temperature is enhanced to the greatest as well as securing combustion stability in its own quality. In this instance, because the roughness control gain $\theta_K$ is changed by an increment of value $\theta_{JA}$ when a heavy fuel is supplied, an ignition timing IGT(n) is quickly corrected toward an advanced side by increasing the roughness control value $\theta_{rgh}(n)$, as a result of which, fuel combustion is quickly stabilized from the commencement of combustion control.

Further, a roughness control value $\theta_{rgh}(n)$ during idling is learned to renew a roughness learning value $\theta_{std}(n)$ established as an initial roughness control value, after having learned a roughness control value $\theta_{rgh}(n)$ once, the combustion control is suitably performed according to fuel quality and the like immediately after commencement thereof, so as to stabilize fuel combustion immediately after an engine start. During idling, the engine 1 maintains a desired idle speed by controlling intake air quantity. In the above embodiment, while the catalytic converter 27 installed in the exhaust passage 25 downstream from the exhaust manifold is generally hard to be warmed as compared with a catalytic converter installed directly in the exhaust manifold, however, it is effectively warmed up due to an accelerated rise in exhaust gas temperature. In other words, the degree of design freedom of the exhaust line is improved. For example, improvement of engine output is realized by designing an exhaust manifold having high exhaust efficiency.

Figure 19:
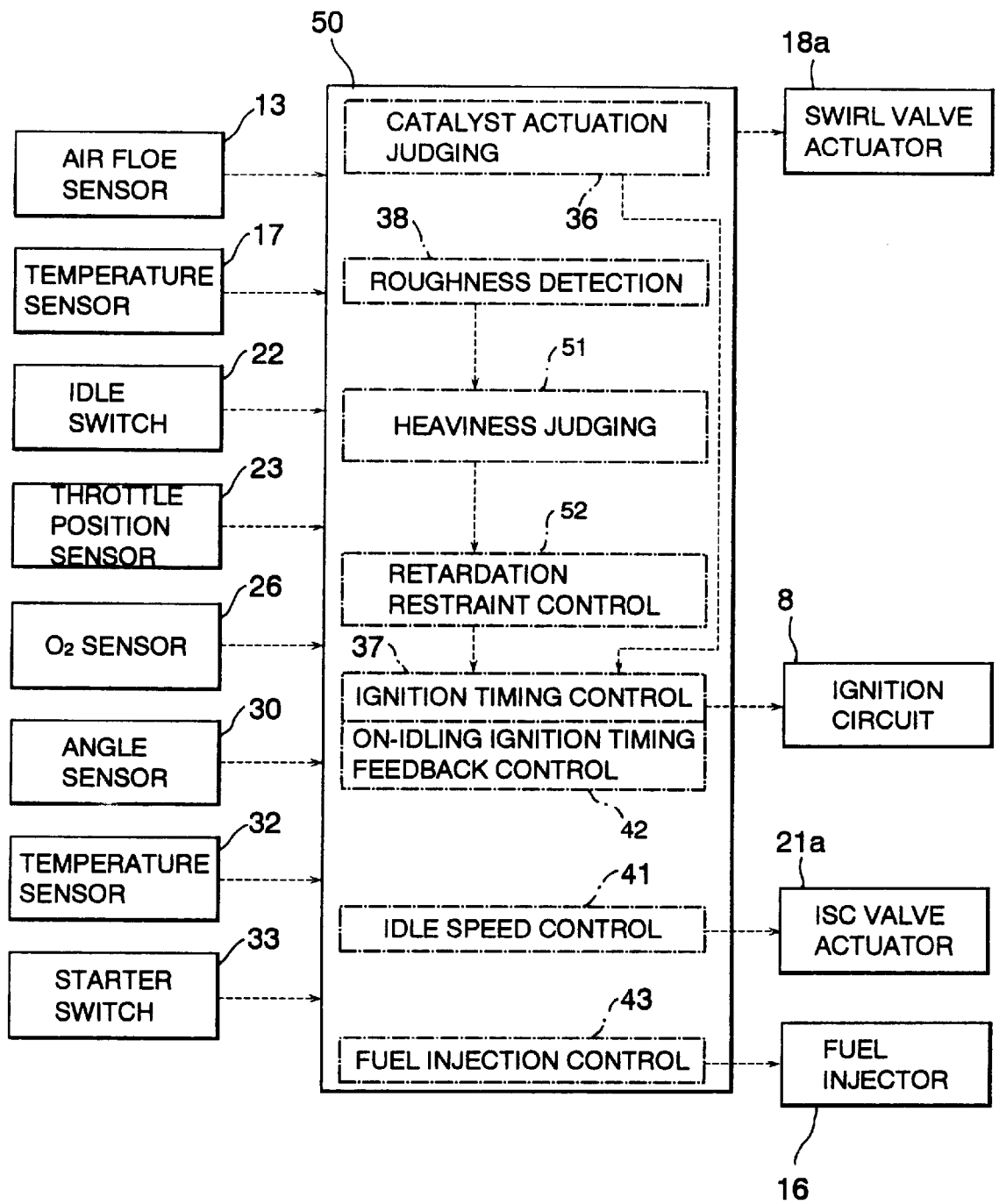
FIG. 19 is a schematic block diagram showing an engine control unit incorporated in a fuel combustion control system in accordance with another embodiment of the invention.

FIG. 19 shows an engine control unit (ECU) 50 according to another embodiment for the engine control system A shown in FIG. 1.

As shown in FIG. 19, the ECU 50 receives signals from various sensors and switches including the air flow sensor 13, the intake air temperature sensor 17, the idle switch 22, the throttle position sensor 23, the $O_2$ sensor 26, the crankangle sensor 30, the water temperature sensor 32 and the starter switch 33 and provides control signals including an injector pulse to the fuel injector 16, an ignition signal to the ignition circuit 8, actuator signals to the actuators 18a and 21a of the swirl valve 18 and the idle speed control valve 21, respectively. The ECU 50 governs ignition timing retarding control for causing an accelerated rise in catalyst temperature and retardation restraining control for strictly restraining retardation of an ignition timing to give combustion stabilization priority over a rise in catalyst temperature. Similarly to the ECU 50 shown in FIG. 2, the ECU 50 has a functional block (catalyst activation judging block) 36, a functional block (ignition timing control block) 37, a functional block (roughness detection block) 38, a functional block (idle speed control block) 41, a functional block (on-idle ignition timing feedback control block) 42 and a functional block (fuel injection control block) 43. The ECU 50 further has a function block (heaviness judging block) 51 for making a judgement as to whether a fuel is of a heavy type based on a result of the judgement made at the functional block (roughness detection block) 38 and a function block (retardation restraining control block) 52 for restraining an ignition timing retardation to a specified value on the small side when a fuel is judged to be heavy.

Figure 20:
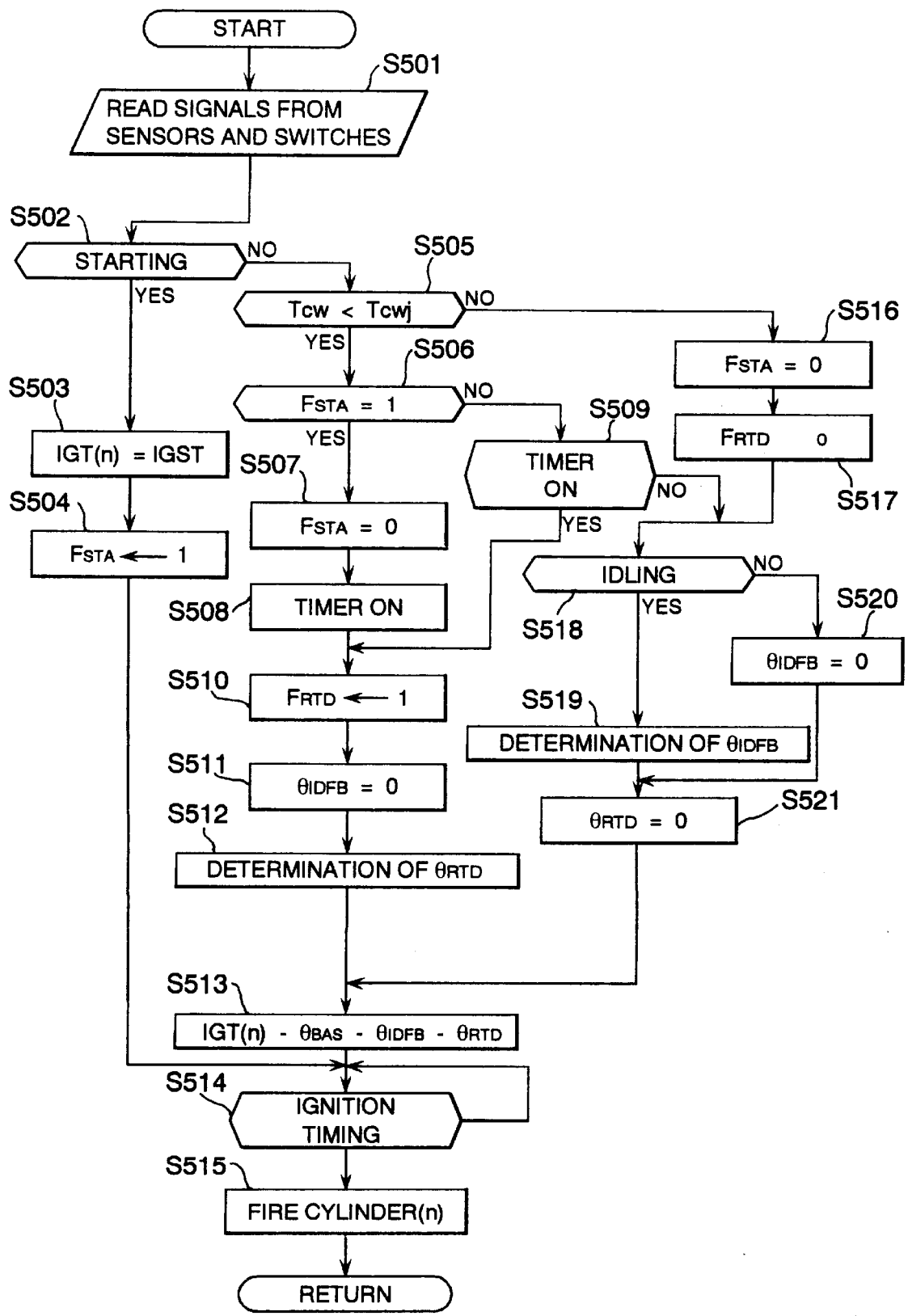
FIG. 20 is a flow chart illustrating a sequence routine of ignition timing control for a microprocessor of the engine control unit of FIG. 19.

FIG. 20 is a flow chart illustrating a sequence routine of ignition timing control for the microprocessor of the ECU 50.

As shown, the flow chart logic commences and control proceeds directly to a function block at step S501 where the ECU 50 reads signals from the sensors and switches including the air flow sensor 13, the intake air temperature sensor 17, the idle switch 22, the throttle position sensor 23, the $O_2$ sensor 26, the crankangle sensor 30, the water temperature sensor 32 and the starter switch 33. Subsequently, at step S502, a judgement is made as to whether the engine 1 is starting. When there is no signal from the starter with which a starter motor is actuated or an engine speed is lower than a specified rate, the engine is judged to be not starting. When the engine is starting, an ignition timing IGST during an engine start is taken as an ignition timing IGT(n) at step S503, and a start flag FSTA is set up to a state of "1" which indicates that the engine is starting, at step S504. When the ignition timing IGT(n) for each cylinder has come at step S514, the spark plug 7 of the cylinder is actuated to fire at step S515.

On the other hand, when the engine is not starting, a judgement is made at step S505 as to whether an cooling water temperature Tcw is lower than a specified point Tcwo, for example 60° C. When the cooling water temperature Tcw is lower than the specified point Tcwo, (60° C.), this indicates that the engine is still cold and hence the catalyst is not yet activated, then, another judgement is made at step S506 as to whether the start flag FSTA is up to the state of "1." When it is up, after resetting down the start flag FSTA at step S507, a timer is actuated to count a specified heating time Tht for which a rise in catalyst temperature is accelerated at step S508. When the start flag FSTA is down, a judgement is made at step S509 as to whether the timer has been actuated and is counting down the heating time Tht. When the timer has been actuated and is counting the heating time Tht, the catalyst of the catalytic converter 27 is judged to be under warming-up, then, an ignition timing ITG(n) is determined through steps S510 to S513.

After setting up a temperature rising flag FRTD to a state of "1" which indicates that a rise in catalyst temperature Tcat is under acceleration by retarding an ignition timing at step S510, a feedback control value $\theta_{IDFB}$ for an ignition timing necessary to keep an idling engine speed Nid remain constant is set to 0 (zero) at step S511. Subsequently, at step S512, a calculation is made to determine an ignition timing retard control value $\theta_{RTD}$ for ignition timing retardation. The calculation of an ignition timing retard control value $\theta_{RTD}$ will be described later. At step S513, an ignition timing IGT(n) is determined as follows:

IGT(n)=$\theta_{BASE}-\theta_{IDFB}-\theta_{RTD}$ where $\theta_{BASE}$ is a basic ignition timing expressed by angle which is ordinarily slightly retarded from a specified ignition timing, for example 10° before top dead center, at which the engine 1 produces maximum torque in each cylinder and corresponds to engine speed and air charging efficiency.

When it is judged at step S514 that the ignition timing IGT(n) calculated at step S503 or S513 has come, the spark plug 7 of the cylinder is actuated to fire at step S515.

On the other hand, when the cooling water temperature Tcw is higher than the specified point Tcwo, namely 60° C., this indicates that the engine has been warmed up and hence the catalyst has been activated, then, after resetting down the start flag FSTA and the temperature rising flag FRTD at step S516 and S517, respectively, a judgement is made at step S518 as to whether the engine 1 is idling. This judgement id made based on a signal from the idle switch 22. During idling, the idle switch 22 detects a closed position of the throttle valve 14 and providing a signal representing that the engine is idling. When the engine 1 is idling, a feedback control value $\theta_{IDFB}$ is read from the feedback control map. When the engine 1 is not idling, the feedback control value $\theta_{IDFB}$ is set to 0 (zero) at step S520. After the determination of feedback control value $\theta_{IDFB}$ at step S519 or at step S520, an ignition timing retard control value $\theta_{RTD}$ is set to 0 (zero) at step S521. Subsequently, through steps S213 to S215, an ignition timing IGT is calculated, and the spark plug 7 of a cylinder is actuated to fire at the ignition timing.

Figure 21:
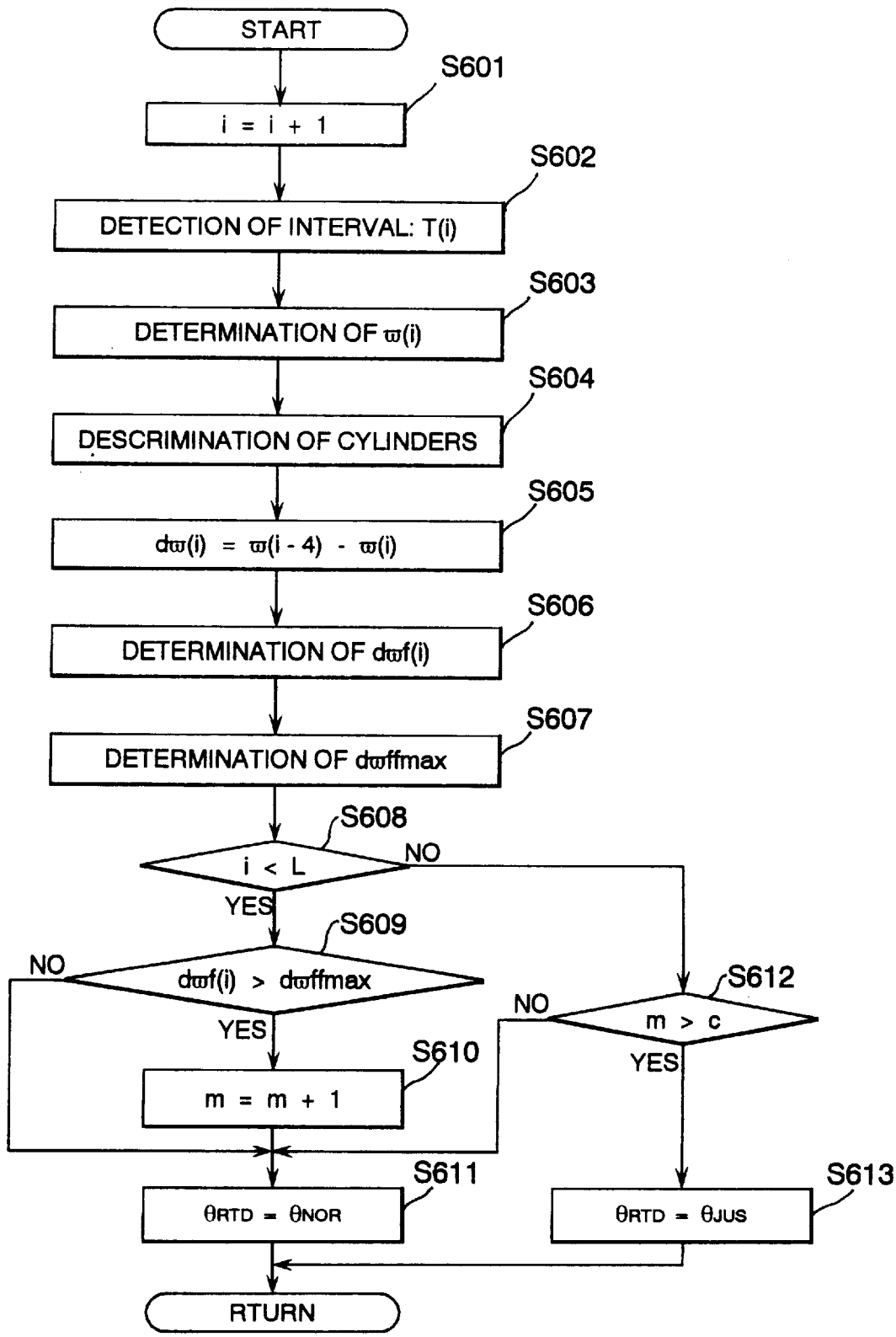
FIG. 21 is a flow chart illustrating a sequence routine of determining a control value for catalyst temperature rise acceleration control for a microprocessor of the engine control unit of FIG. 19.

FIG. 21 is a flow chart illustrating a sequence routine of the control of determining an ignition timing retard control value $\theta_{RTD}(n)$ made at step S512 of the ignition timing control shown in FIG. 20.

As shown, the flow chart logic commences and control proceeds directly to a function block at step S601 where a control cycle, whose initial value is 1 (one), is incremented by one. Subsequently, a time interval T(i) between adjacent signals from the crankangle sensor 30 is measured at step S602, and a crankangular velocity ω(i) of a specified period of time is calculated based on the time interval T(i) at step S603. The period of time within which a crankshaft angular velocity is calculated is determined as described below. After discriminating cylinders based on signals provided by a sensor (not shown) for monitoring a rotational angle of a camshaft (not shown) at step S604, a fluctuation in crankangular velocity dωf(i) is determined removing factors which are noises to determination of a combustion state of each cylinder through steps S505 and S506. These steps S601 through S606 are just identical with steps S201 through S206 of FIG. 4.

Subsequently, at step S607, a fuel heaviness judging value dωffmax, which is slightly larger than a limit of an allowable fluctuation of crankangular velocity regarding necessary combustion stability, is determined based on current engine speed and air charging efficiency with reference to a heaviness judging value map. This heaviness judging value map specifies heaviness judging values relative to engine speeds and air charging efficiency. When the fuel heaviness judging value dωffmax is exceeded by the crankangular velocity fluctuation dωf(i), it is determined that fuel combustion is significantly unstable. When the control cycle (i) has been repeated less than a specified times L at step S608, the fuel heaviness judging value dωffmax is compared with the crankangular velocity fluctuation dωf(i) at step S609. When the fuel heaviness judging value dωffmax is exceeded by the crankangular velocity fluctuation dωf(i), it is determined that fuel combustion is significantly unstable, after changing count m of a counter by an increment of 1 (one) at step S610, a fixed ignition timing retardation $\theta_{NOR}$ is employed as the ignition timing retard control value $\theta_{RTD}(n)$ at step S611. This fixed ignition timing retardation value $\theta_{NOR}$ causes a relatively large retard of ignition timing when a regular fuel having relatively low heaviness is used. On the other hand, the crankangular velocity fluctuation dωf(i) is less than the fuel heaviness judging value dωffmax at step S609 before the control cycle (i) has been repeated more than the specified times L at step S608, or when the count m is less than a specified count c at step S612 after the control cycle (i) has been repeated more than the specified times L at step S608, this indicates that a fluctuation in crankangular velocity has not occurred so often and a regular heaviness of fuel is used, then, the fixed ignition timing retardation $\theta_{NOR}$ greater than 0 (zero) is employed as the ignition timing retard control value $\theta_{RTD}(n)$ at step S611 without changing count m at step S610. Further, when the count m is equal to or greater than the specified count c at step S612 after the control cycle (i) has been repeated more than the specified times L at step S608, this indicates that a fluctuation in crankangular velocity has occurred so often and a heavy fuel is used, then, a fixed ignition timing retardation $\theta_{JUS}$ smaller than $\theta_{NOR}$ but greater than 0 (zero) is employed as the ignition timing retard control value $\theta_{RTD}(n)$ at step S613. This fixed ignition timing retardation $\theta_{JUS}$ restraints retardation of an ignition timing to give combustion stability priority over acceleration of a rise in catalyst temperature.

Figure 22:
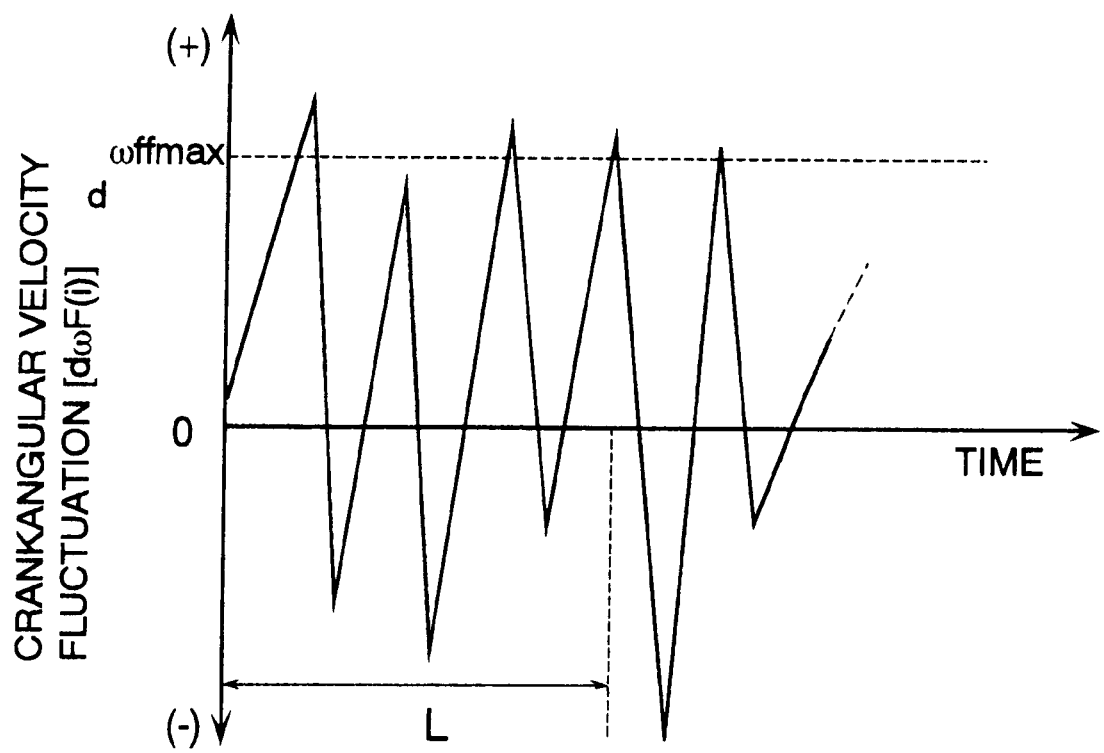
FIG. 22 is a graphical diagram showing fluctuations of crankangular velocity during an early stage of a control cycle.

As shown in FIG. 22, a fluctuation in crankangular velocity is counted until the control cycle is repeated the predetermined number of times L and a fuel is judged based on the count whether it is heavy or not. When a heavy fuel is used, an ignition timing is restrictively retarded to give combustion stability priority over acceleration of a rise in catalyst temperature. Accordingly, in this embodiment, when the catalyst is not yet wormed up, an ignition timing IGT(n) is retarded to accelerate a rise in catalyst temperature. It is judged whether a fuel used is heavy or not based on an actual state of fuel combustion which is precisely judged based on fluctuations of crankangular velocity. When a heavy fuel of inferior ignitability and combustibility is used, the ignition timing control is performed so as to give combustion stability priority over acceleration of a rise in catalyst temperature. As a result, even when a heavy fuel is used, a sharp increase in harmful emissions due to unstable fuel combustion is effectively prevented.

Figure 23:
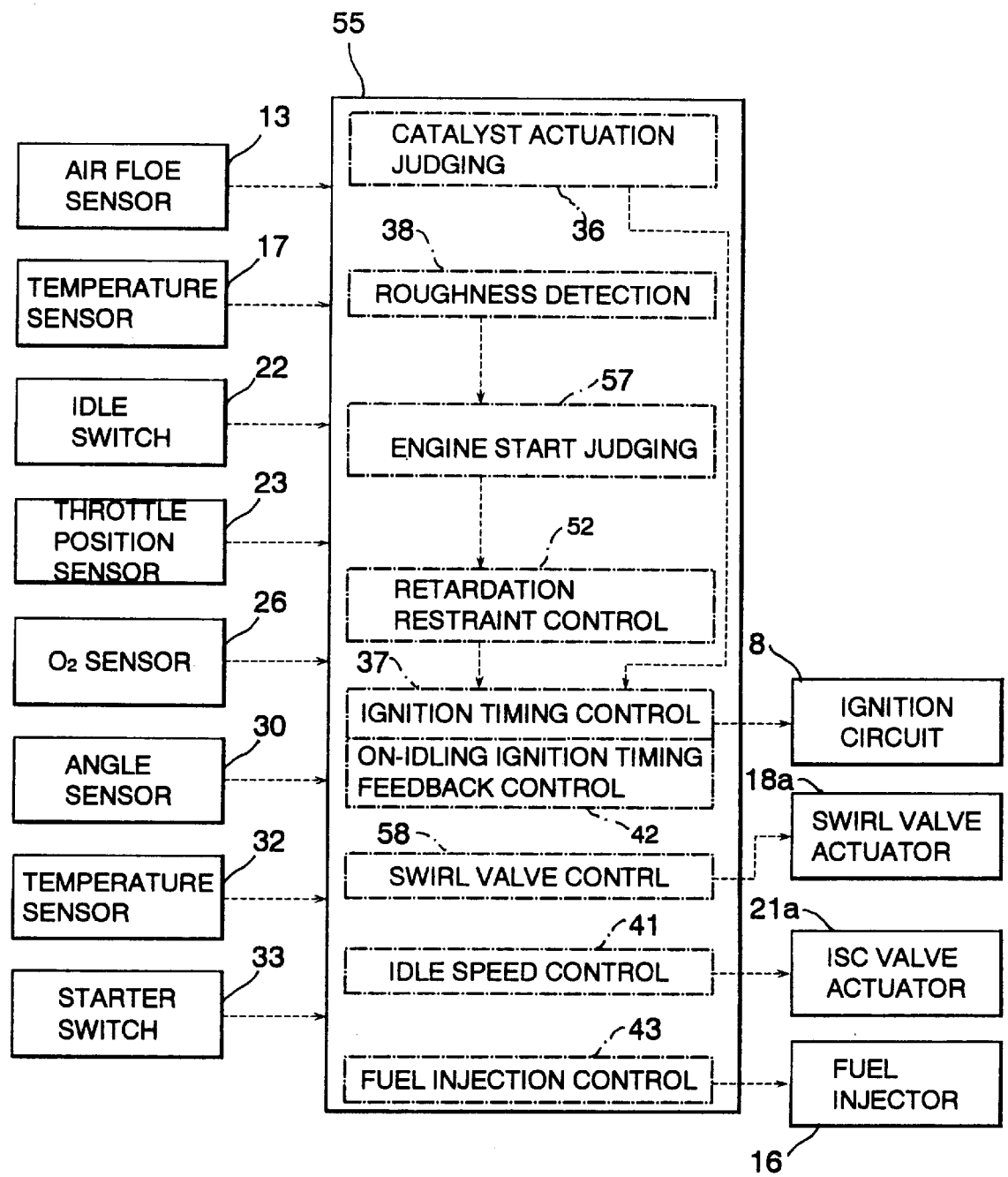
FIG. 23 is a schematic block diagram showing an engine control unit incorporated in a fuel combustion control system in accordance with another embodiment of the invention.

FIG. 23 shows an engine control unit (ECU) 55 according to another embodiment for the engine control system A shown in FIG. 1 for performing ignition timing retardation control immediately after a cold engine start to cause a quick rise in catalyst temperature. In this embodiment, the ECU 55 governs air-fuel ratio feedback control to deliver a stoichiometric air-fuel ratio by regulating a injector pulse width and fuel injection control to produce a swirl in the combustion chamber 6.

Figure 24:
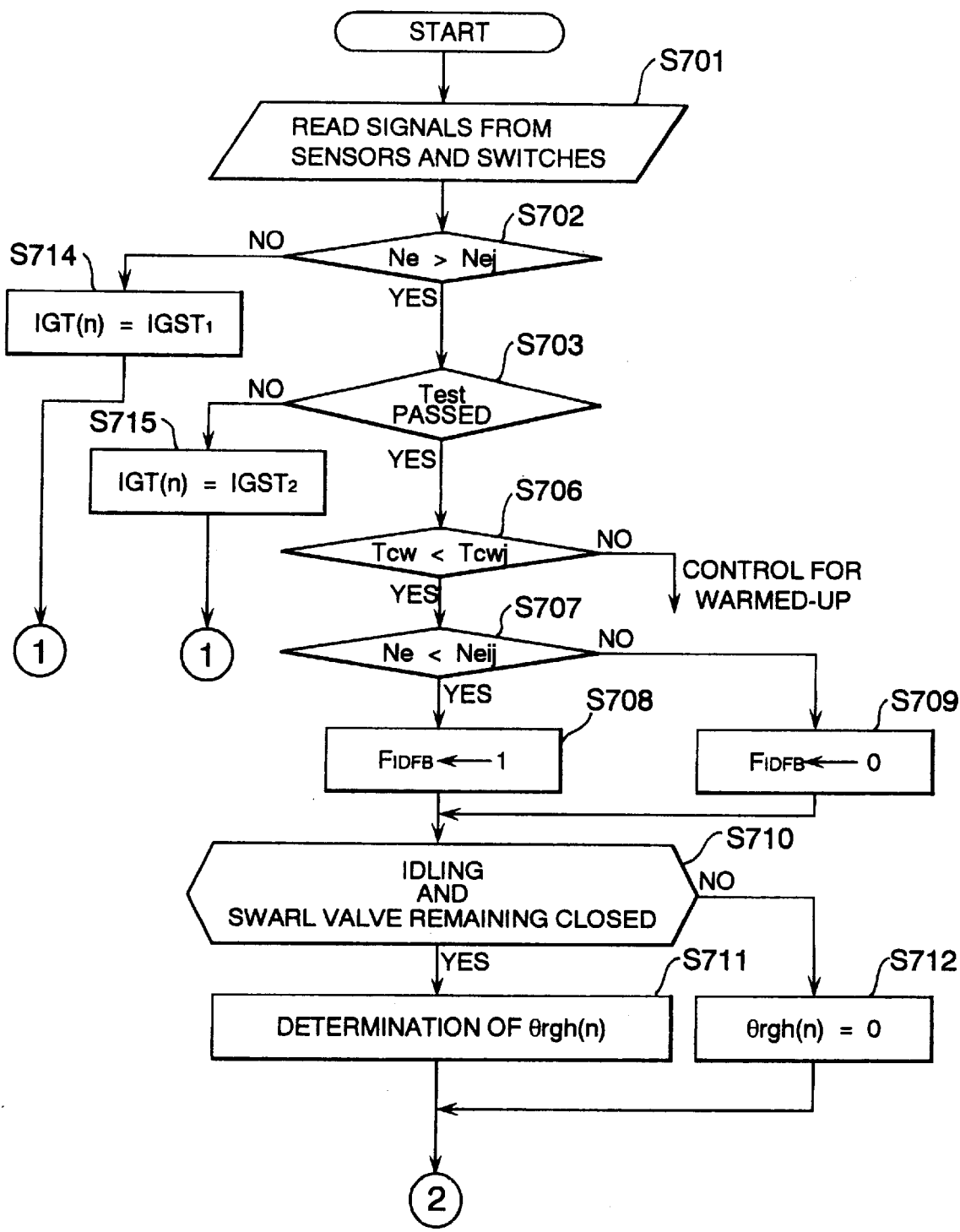
FIGS. 24 and 25 are a flow chart illustrating a sequence routine of ignition timing control for a microprocessor of the engine control unit of FIG. 23.
Figure 25:
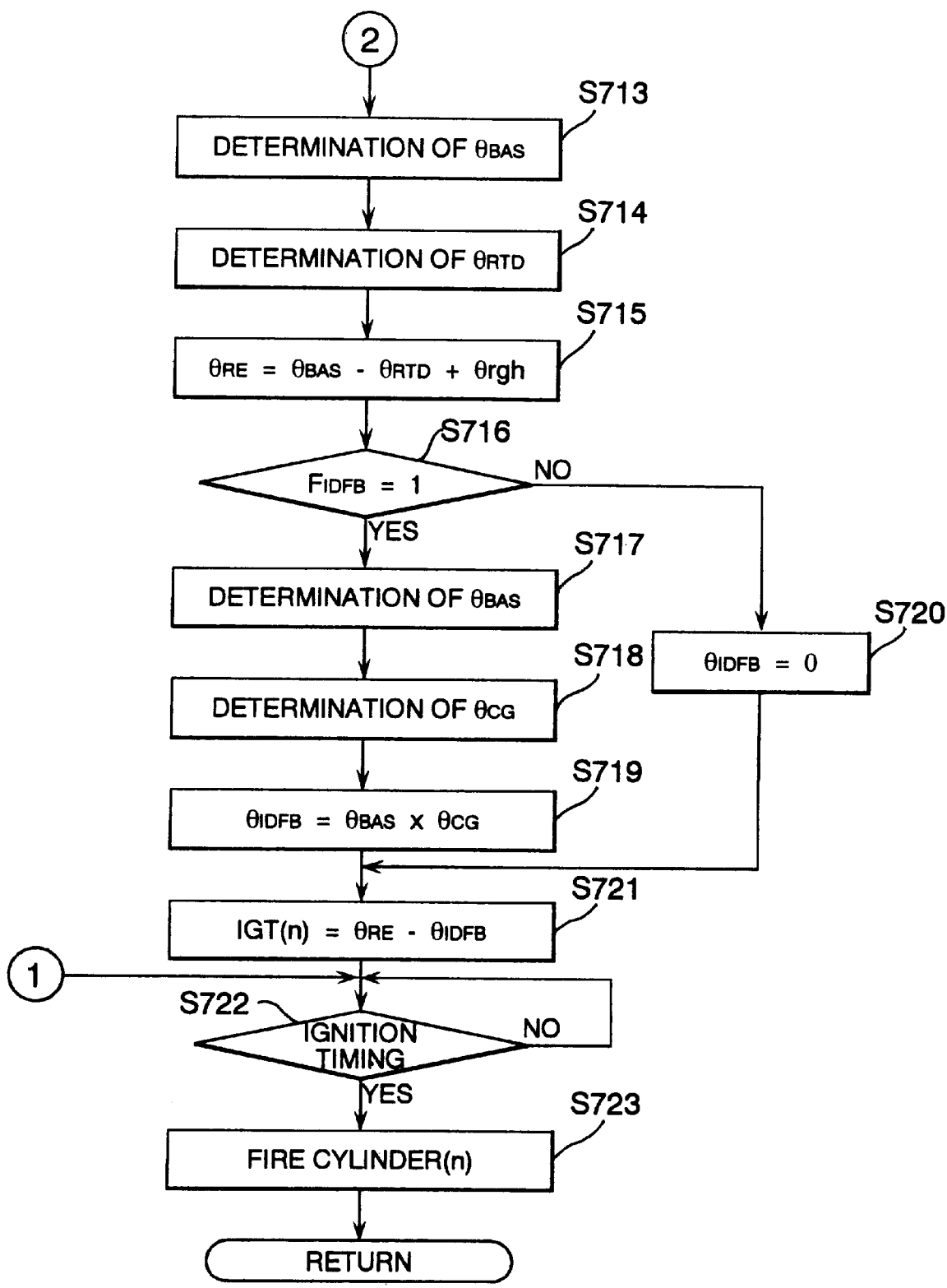

As shown, the ECU 55 receives signals from various sensors and switches including the air flow sensor 13, the intake air temperature sensor 17, the idle switch 22, the throttle position sensor 23, the $O_2$ sensor 26, the crankangle sensor 30, the water temperature sensor 32 and the starter switch 33 and provides control signals including an injector pulse to the fuel injector 16, an ignition signal to the ignition circuit 8, actuator signals to the actuators 18a and 21a of the swirl valve 18 and the idle speed control valve 21, respectively. The ECU 55 governs ignition timing retarding control for causing an accelerated rise in catalyst temperature and retardation restraining control for strictly restraining retardation of an ignition timing to give combustion stabilization priority over a rise in catalyst temperature. Similarly to the ECU 55 shown in FIG. 2, the ECU 55 has a functional block (catalyst activation judging block) 36, a functional block (ignition timing control block) 37, a functional block (roughness detection block) 38, a functional block (ignition timing correction control block) 39, a functional block (idle speed control block) 41, a functional block (on-idle ignition timing feedback control block) 42, and a functional block (fuel injection control block) 43, which have the same functions as those of ECU 35 of FIG. 2 or ECU 50 of FIG. 19. The ECU 55 further has a functional block (engine start judging block) 57 for judging an end of engine start, and a functional block (swirl valve control block) 58 for closing a swirl valve 18 to control fuel combustion while the engine 1 is cold. fuel injection FIGS. 24 and 25 are a flow chart illustrating a sequence routine of ignition timing control for the microprocessor of the ECU 55.

As shown, when the flow chart logic commences and control proceeds directly to a function block at step S701 where the ECU 55 reads signals from the sensors and switches including at least the air flow sensor 13, the crankangle sensor 30, the temperature sensor 32, the idle switch 22 and the starter switch 33. Subsequently, a judgement regarding completion of engine start is made based on an engine speed and a cooling water temperature at steps S702 and S703. When a specified time Test, for example one second, has lapsed at step S703 after a current engine speed Ne has exceeded a fixed speed Nej, for example 500 rpm, at step S702, this indicates that there is a complete explosion of a fuel mixture in the combustion chamber 6 for the specified period of time, the engine 1 is determined to be completely started. When the engine speed Ne is still lower than the fixed speed Nej, this indicates that the engine 1 is still under starting, then, a starting ignition timing IGST1, which is fixed at, for example, a crankangle of 5° before top dead center of a compression stroke, is employed as an ignition timing IGT(n) at step S704. Further, when, while the engine speed Ne has exceeded the fixed speed Nej, it is within a duration of the specified time Test, a fixed ignition timing IGST2, which is fixed at, for example, a crankangle of 20° before top dead center of a compression stroke for an advance of ignition timing during an engine start, is employed as an ignition timing IGT(n) at step S705.

As shown in FIGS. 26A and 26B, fuel combustion is made with an ignition timing at, for example, a crankangle of 6° before top dead center of a compression stroke for the beginning of an engine start, i.e. until a state of complete explosion is attained after cranking, as well as for ordinary engine operation. Thereafter, until fuel combustion is stabilized as a result of a boost of engine speed after a state of complete explosion has been attained, an ignition timing is advanced near to a point of minimum advance for best torque (MABT).

After completion of an engine start, a cooling water temperature Tcw is compared with a specified temperature Tcwj at step S706. When the cooling water is higher than the specified temperature Tcwj, this indicates that the engine 1 has been warmed up, then, the ignition timing control which was previously described regarding the embodiment shown in FIGS. 2–4. On the other hand, when the cooling water is still lower than the specified temperature Tcwj, i.e. the engine 1 is still cold, then, after making a judgement at step S707 as to whether the engine 1 is idling with a speed Ne lower than a target idle speed Neij, an on-idle ignition timing feedback control flag F$_{IDFB}$ is set up or reset down. Specifically, when the engine 1 is idling with a speed Ne lower than the target idle speed Neij, the on-idle ignition timing feedback control flag F$_{IDFB}$ is set up to a state of "1" which dictates execution of the on-idle ignition timing feedback control for achievement of the target idle speed Neij at step S708. On the other hand, when the engine 1 is idling with a speed Ne equal to or higher than the target idle speed Neij, the on-idle ignition timing feedback control flag F$_{IDFB}$ is reset down at step S709. By this way, as shown in FIGS. 26A and 26B, the on-idle ignition timing feedback control is executed when an engine speed Ne drops to the target idle speed Neij.

After setting up or resetting down the on-idle ignition timing feedback control flag F$_{IDFB}$ at step S708 or S709, a judgement is made at step S710 as to whether the roughness learning control should be executed. The roughness learning control is executed when, while the engine 1 is idling, the swirl valve 18 remains closed. While the engine 1 is idling with the swirl valve remaining closed, a roughness control value $\theta_{rgh}(n)$ is determined at step S711. This determination is made following the roughness control value determination sequence routine shown in FIGS. 4 and 5. When the swirl valve 18 does not remain closed, a roughness control value $\theta_{rgh}(n)$ is set to 0 (zero) at step S712. Subsequently to determination of a roughness control value $\theta_{rgh}(n)$, a base ignition timing $\theta_{BASE}$ is determined based on a current air charging efficiency and a current engine speed Ne with reference to the base ignition timing map at step S713, and an ignition timing retard control value $\theta_{RTD}$ is determined based on a cooling water temperature with reference to a ignition timing retard map at step S714. This ignition timing retard map specifies ignition timing retard control value $\theta_{RTD}$ gradually increasing with a rise in cooling water temperature between 0 and 20° C., remaining fixed at a peak value at a cooling water temperature between 20 and 40° C., and gradually decreasing with an increase in cooling water temperature between 40 and 60° C. Subsequently, at step S715, a necessary ignition timing advance $\theta_{RE}$ is determined as follows:

$$\theta_{RE}=\theta_{BASE}-\theta_{RTD}+\theta_{rgh}(n)$$

After judgement regarding the on-idle ignition timing feedback control flag F$_{IDFB}$ at step S716, when the on-idle ignition timing feedback control flag F$_{IDFB}$ is up, a basic ignition timing correction value $\theta_{BASE}$ is determined based on a difference of a current engine speed Ne from the target idle speed Neij with reference to an ignition timing correction value map shown below.

| | Ne - Neij | | |
|---|---|---|---|
| | S ←-------------- | 0 | --------------→ L |
| $\theta_{BASE}$ | 10° ←-------------- | 0 | --------------→ -10° |

As indicated in the above table, the basic ignition timing correction value D$\theta_{BASE}$ is changed larger as the speed difference (Ne–Neij) becomes larger. At step S718, a correction gain $\theta_{CG}$ for the on-idle ignition timing feedback control is determined based on the necessary ignition timing advance $\theta_{RE}$ with reference to a correction gain map shown below.

| | $\theta_{RE}$ | | | |
|---|---|---|---|---|
| | -20 | -10 | 0 | 10 |
| $\theta_{CG}$ | 0.5 | 0.7 | 0.9 | 1 |

Subsequently, at step S719, a feedback control value $\theta_{IDFB}$ is determined as follows:

$$\theta_{IDFB}=\theta_{BASE}\times\theta_{CG}$$

When the on-idle ignition timing feedback control flag F$_{IDFB}$ is down, a feedback control value $\theta_{IDFB}$ is fixed to 0 (zero) at step S720. After the determination of feedback control value $\theta_{IDFB}$ at step S719 or S720, an ignition timing IGT(n) is determined as follows at step S721:

$$IGT(n)=\theta_{RE}-\theta_{IDFB}$$

Subsequently to the determination of ignition timing IGT(n) at step S704, S705 or S721, when the ignition timing IGT(n) is reached at step S722, the spark plug 7 of the cylinder is actuated to fire at step S723.

Figure 27:
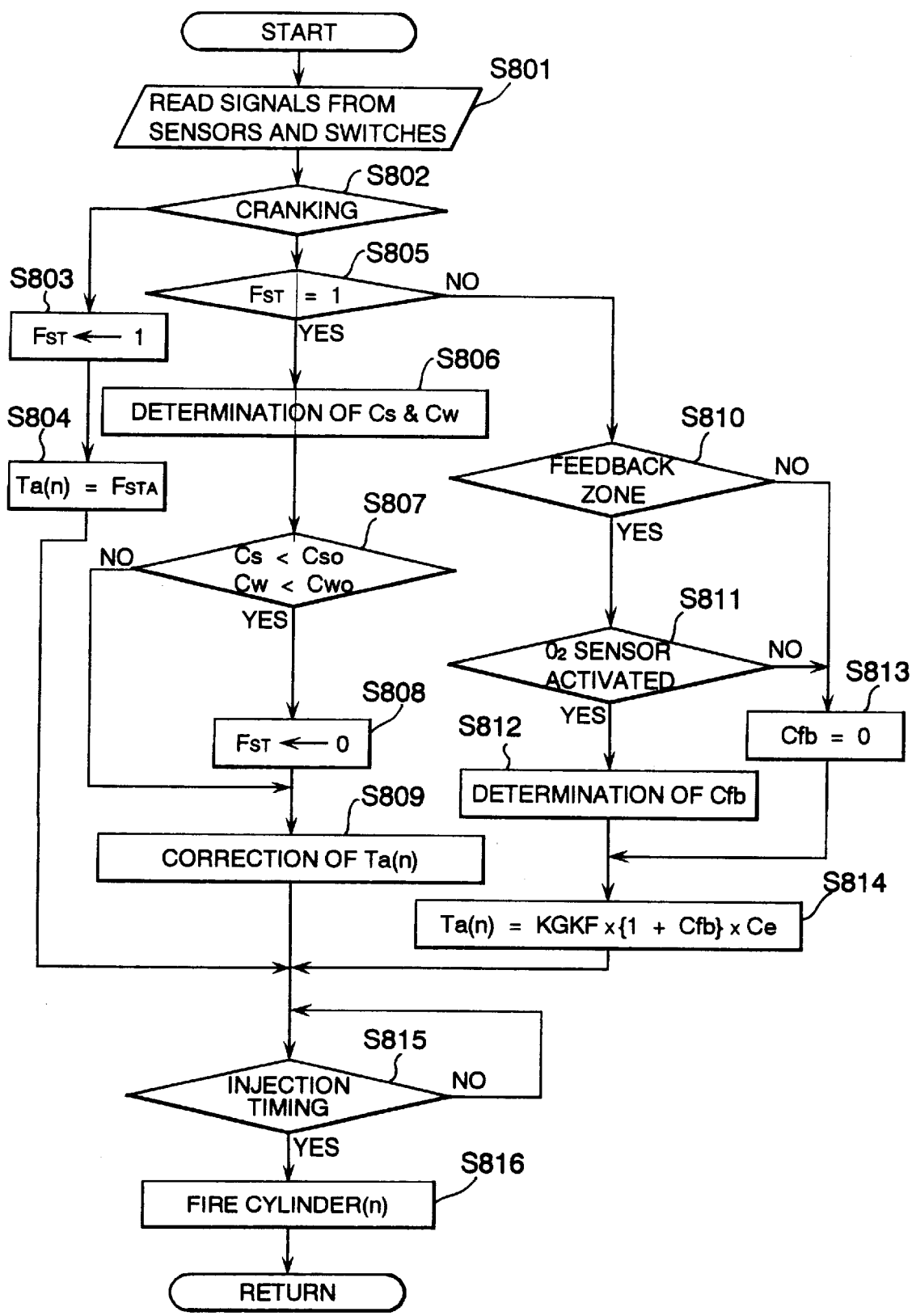
FIG. 27 is a flow chart illustrating a sequence routine of fuel injection control for a microprocessor of the engine control unit of FIG. 19.

FIG. 27 is a flow chart illustrating a sequence routine of fuel injection control governed at the fuel injection control block 43 of the ECU 55.

As shown, when the flow chart logic commences and control proceeds directly to a function block at step S801 where the ECU 55 reads signals from the sensors and switches including at least the air flow sensor 13, the O$_2$ sensor 26, the crankangle sensor 30, and the starter switch 33. Subsequently, a judgement is made at step S802 as to whether the engine is being cranked. When the engine 1 is being cranked, after setting a cranking flag F$_{ST}$ to a state of "1" which indicates that it is within a specified period of time after engine cranking at step S803, an injector pulse width Ta(n) is fixed at a pulse width T$_{STA}$ specified for an engine start at step S804. On the other hand, when the engine 1 is not under cranking, a judgement regarding the cranking flag F$_{ST}$ is made at step S805. When the cranking flag F$_{ST}$ has been up, a fuel injection increment Cs used independently from a current cooling water temperature Tcw during an engine start and a fuel injection increment Cw used dependently upon cooling water temperature after an engine start are determined. The fuel injection increment Cs is determined by subtracting a constant rate from a predetermined initial rate wide of, for example, 20% every control cycle. The fuel injection increment Cw is determined according to a current cooling water temperature Tcw with reference to a map. The map specifies a fuel injection decrement Cw gradually changing smaller as the cooling water temperature rises. These fuel injection increments Cs and Cw are compared with threshold values Cso and Cwo, respectively, at step S807. After resetting down the cranking flag F$_{ST}$ at step S808 when both fuel injection increments Cs and Cw are lower than the threshold values Cso and Cwo, respectively, or directly after the judgement when either one or both fuel injection increment Cs and decrement Cw are equal to or higher than the threshold values Cso and Cwo, respectively, a current injection pulse width Ta(n) is determined by correcting the last injection pulse width Ta(n) with the fuel injection increments Cs and Cw at step S809. Through these steps, an air-fuel mixture is enriched to stabilize fuel combustion for a while immediately after an engine start.

On the other hand, when the cranking flag F$_{ST}$ is down, a judgement is made at step S810 as to whether the engine is operating in a feedback control zone. The feedback control zone is defined out of both fuel increase zone in which an air-fuel mixture is enriched to restrain a rise in exhaust gas temperature and fuel cut zone in which a fuel injection is temporarily interrupted. It is determined that the engine 1 is operating in the feedback control zone when, while the cooling water is higher than a specified temperature of, for example, 20° C., the engine 1 is not operating within the fuel increase and fuel cut zones nor being accelerated or decelerated. When, while the engine 1 is within the feedback control zone, the $O_2$ sensor 26 has been effectively activated at step S811, an air-fuel ratio feedback control correction value Cfb necessary to attain a stoichiometric air-fuel ratio is determined based on an air-fuel ratio indicated by a signal from the $O_2$ sensor 26 at step S812. On the other hand, when, while the engine 1 is in the feedback control zone, the $O_2$ sensor 26 is not yet effectively activated, or when the engine 1 is out of the feedback control zone nor the $O_2$ sensor 26 has been effectively activated, an air-fuel ratio feedback control correction value Cfb is fixed at 0 (zero) at step S813. After the determination of air-fuel ratio feedback correction value Cfb at step S812 or S813, a current injection pulse width Ta(n) is determined at step S814 as follows:

$$Ta(n) = KGKF \times (1+Cfb) \times Ce$$

where KGKF is the injector flow factor, and Ce is the air charging efficiency.

Subsequently to the determination of injection pulse width Ta(n) at step S804, S809 or S814, when the ignition timing IGT(n) is reached at step S815, the fuel injector 16 is pulsed to deliver fuel correspondingly to the injection pulse width Ta(n) at step S816.

As shown in FIG. 26C, for a while after a boost of engine speed resulting complete explosion, an air-fuel ratio is corrected toward the rich side according to fuel injection increments Cs and Cw. Thereafter, when the $O_2$ sensor 26 has been effectively activated, an air-fuel ratio is feedback controlled based on a signal from the $O_2$ sensor 26.

Figure 28:
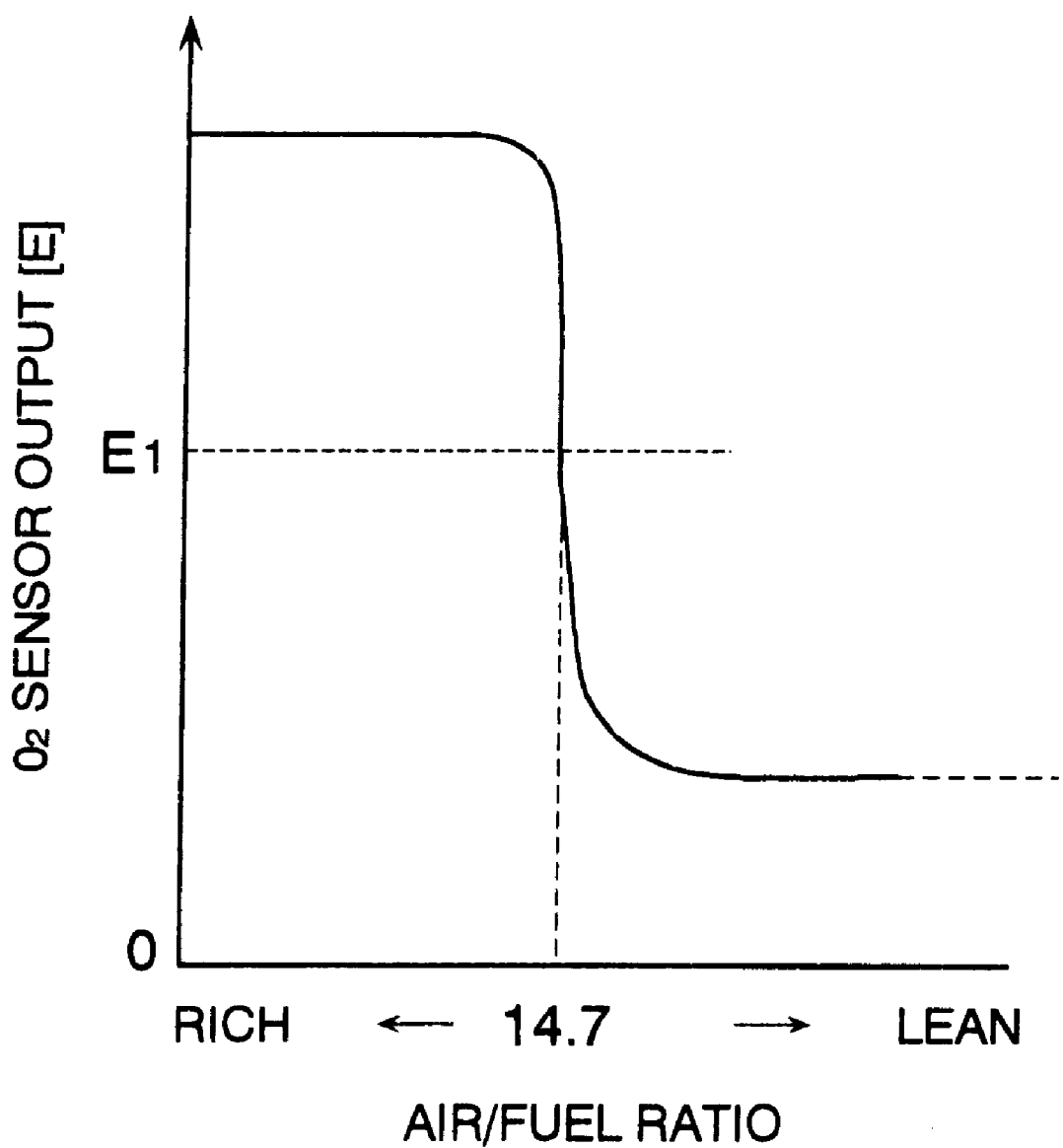
FIG. 28 is a graphical diagram showing the output characteristic of an oxygen sensor.

FIG. 28 shows an output characteristic of the $O_2$ sensor 26.

As shown, an electromotive force shows a normal level E1 when the oxygen concentration in exhaust gas corresponds to a stoichiometric air-fuel ratio and sharply rises or drops when an air-fuel mixture changes toward the rich side or the lean side from the stoichiometric mixture, respectively.

Figure 29:
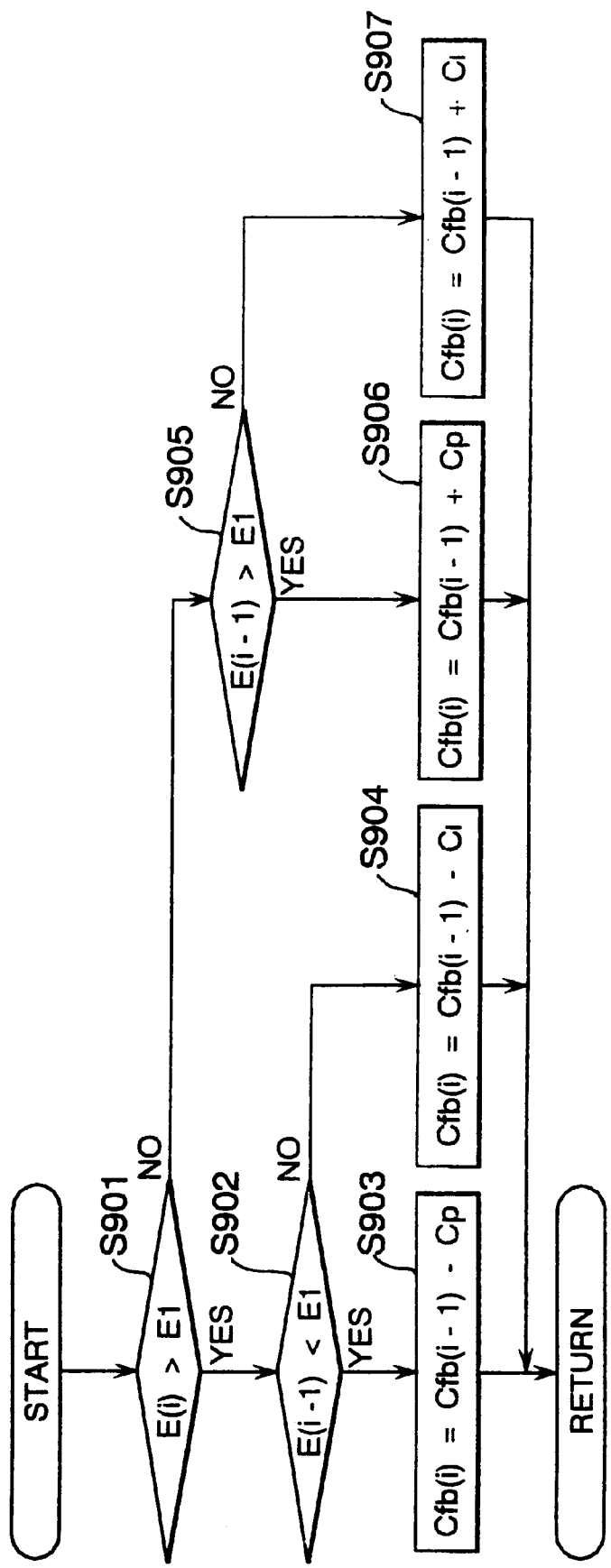
FIG. 29 is a flow chart illustrating a sequence routine of air-fuel feedback correction value control for a microprocessor of the engine control unit of FIG. 19.

FIG. 29 is a flow chart illustrating a sequence routine of the determination of air-fuel ratio feedback correction value Cfb made at step S711.

As shown, when the flow chart logic commences and control proceeds directly to a judgement at step S901 where a current output level E(i) of the $O_2$ sensor 26 is compared with the normal level E1 which indicates a stoichiometric air-fuel ratio. When the current output level E(i) is higher than the normal level E1, an previous output level E(i−1) during the last cycle is compared with the normal level E1 at step S902. When the previous output level E(i−1) is equal to or lower than the normal level E1, an air-fuel ratio feedback correction value Cfb(i) is determined by subtracting a relatively large control gain CP from a previous air-fuel ratio feedback correction value Cfb(i−1) at step S903. On the other hand, when the previous output level E(i−1) is higher than the normal level E1, an air-fuel ratio feedback control correction value Cfb(i) is determined by subtracting a relatively small control gain CI to the previous air-fuel ratio feedback control correction value Cfb(i−1) at step S904.

When the current output level E(i) is equal to or lower than the normal level E1, the previous output level E(i−1) is compared with the normal level E1 at step S905. When the previous output level E(i−1) is higher than the normal level E1, an air-fuel ratio feedback control correction value Cfb(i) is determined by adding the large control gain CP to a previous air-fuel ratio feedback control correction value Cfb(i−1) at step S906. On the other hand, when the previous output level E(i−1) is equal to or less than the normal level E1, an air-fuel ratio feedback control correction value Cfb(i) is determined by adding the small control gain CI to the previous air-fuel ratio feedback control correction value Cfb(i−1) at step S907.

Figure 30:
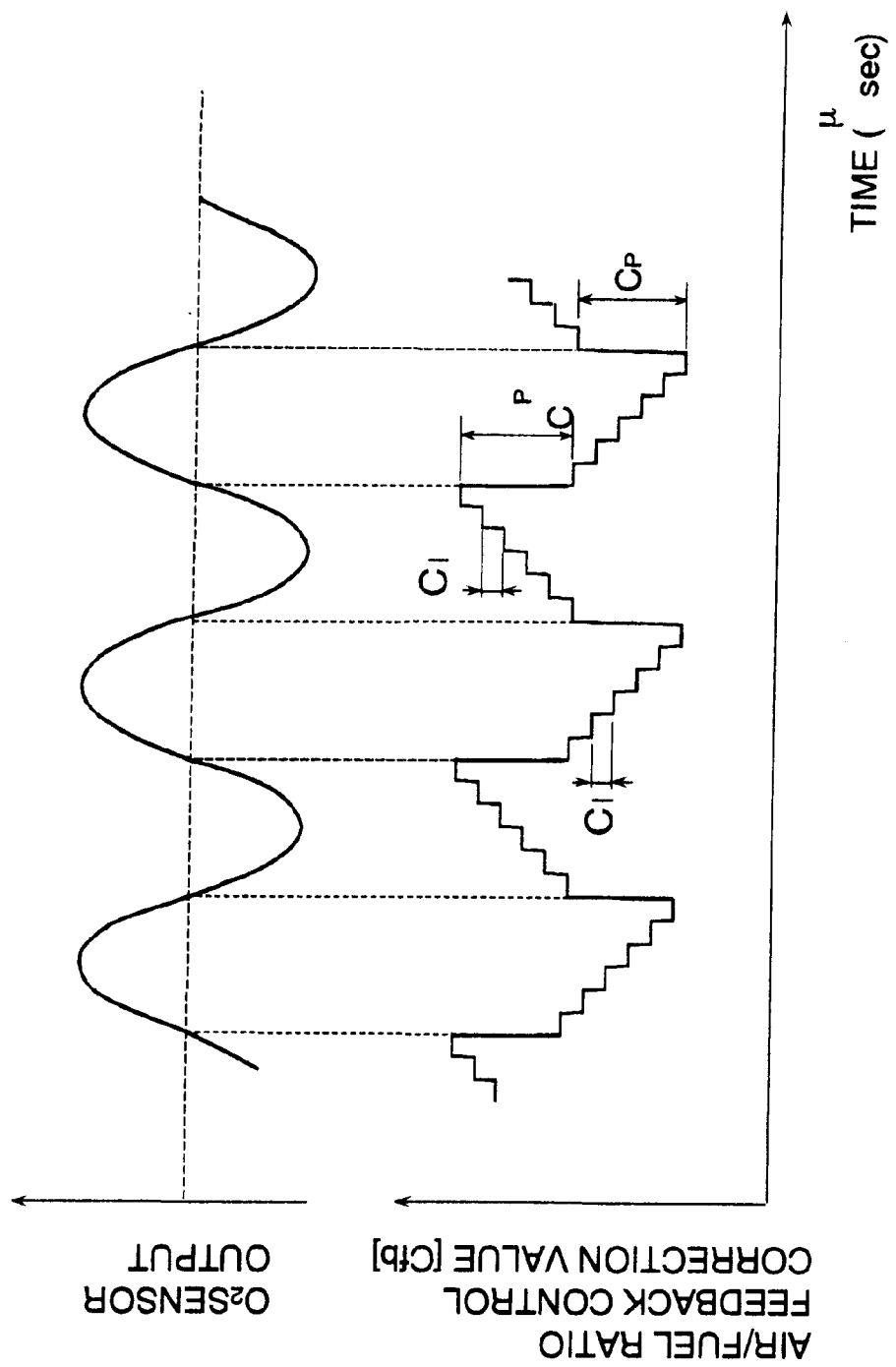
FIG. 30 is a graphical diagram showing a change in air-fuel feedback correction value relative to a change in oxygen sensor output.

As shown in FIG. 30, during a period in which an output level E(i) of the $O_2$ sensor 26 is higher than the normal level E1, the air-fuel ratio feedback control correction value Cfb(i) is changed by a decrement of the control gain CP or CI every control cycle to reduce an injector pulse width Ta(n), so as to decrease fuel injection quantity and thereby to bring an air-fuel mixture more lean. As a result, the output level E(i) of the $O_2$ sensor 26 drops gradually toward the normal level E1. On the other hand, when an output level E(i) of the $O_2$ sensor 26 reverses between opposite sides of the normal level E1 due, for example, to a change in air-fuel ratio above the stoichiometric air-fuel ratio or a change in air-fuel ratio below the stoichiometric air-fuel ratio, the air-fuel ratio feedback control correction value Cfb(i) is sharply changed by subtracting the large control gain CP. On the other hand, an output level E(i) of the $O_2$ sensor 26 remains on either side of the normal level E1, the air-fuel ratio feedback control correction value Cfb(i) is gradually changed by subtracting the small control gain CP.

When an output level E(i) of the $O_2$ sensor 26 is lower than the normal level E1, the air-fuel ratio feedback control correction value Cfb(i) is changed by an increment of the control gain CP or CI every control cycle to increase an injector pulse width Ta(n), so as to increase the fuel injection quantity and thereby to bring an air-fuel mixture more rich. As a result, the output level E(i) of the $O_2$ sensor 26 rises gradually toward the normal level E1. Further, when an output level E(i) of the $O_2$ sensor 26 reverses between opposite sides of the normal level E1, the air-fuel ratio feedback control correction value Cfb is sharply changed by adding the large control gain CP. On the other hand, an output level E(i) of the $O_2$ sensor 26 remains on either side of the normal level E1, the air-fuel ratio feedback control correction value Cfb is gradually changed by adding the small control gain CP. Because the fuel injection quantity is feedback controlled based on an output level of the $O_2$ sensor 26, an air-fuel ratio of an air-fuel mixture reverses between opposite sides, namely a richer side and a leaner side, of the stoichiometric air-fuel ratio, as a result of which, the catalyst converter is caused to show effectively its conversion efficiency.

As shown in FIG. 26C, an air-fuel ratio periodically changes between opposite sides, namely a richer side and a leaner side, of the stoichiometric air-fuel ratio (14.7) due to the feedback control of fuel injection based on a signal from the $O_2$ sensor 26, so as to make the catalyst do excellent job with desired conversion efficiency.

Figure 31:
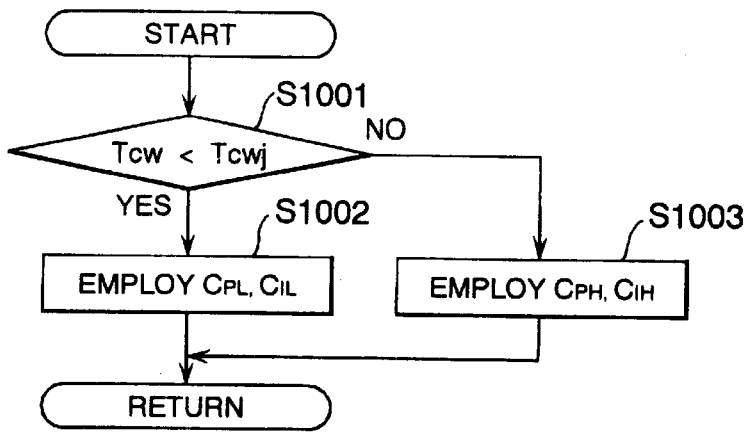
FIG. 31 is a flow chart illustrating a sequence routine of air-fuel feedback gain replacing control for a microprocessor of the engine control unit of FIG. 19.

FIG. 31 is a flow chart illustrating a sequence routine of replacing control gains CP and CI according to cooling water temperatures used to determine the air-fuel ratio feedback control correction value Cfb.

As shown, when the flow chart logic commences and control proceeds directly to a function block at step S1001 where a current cooling water temperature Tcw is compared with a specified temperature Tcwj, for example 60° C. When cooling water temperature Tcw is lower than the specified temperature Tcwj, this indicates that the engine 1 is still cold, then, control gains $C_{PL}$ and $C_{IL}$ predetermined for lower temperatures below the specified temperature Tcwj are employed at step S1002. On the other hand, when cooling water temperature Tcw is equal to or higher than the specified temperature Tcwj, this indicates that the engine 1 has warmed up, then, control gains $C_{PH}$ and $C_{IH}$ predetermined for higher temperatures above the specified temperature Tcwj, which are greater than the control gains $C_{PL}$ and $C_{IL}$, respectively, are employed at step S1003. Although fuel vaporization is deficient while the engine 1 is cold and, as a result of which, a time delay in the air-fuel control increases and controllability is deteriorated, employing smaller control gains $C_{PL}$ and $C_{IL}$ prevents deterioration of stability of the air-fuel control. Accordingly, while an air-fuel ratio periodically changes between the rich side and the lean side on opposite sides of a stoichiometric air-fuel ratio, fluctuations are relatively during cold engine operation but become relatively large after the engine 1 has been warmed up as shown in FIG. 26C.

Figure 32:
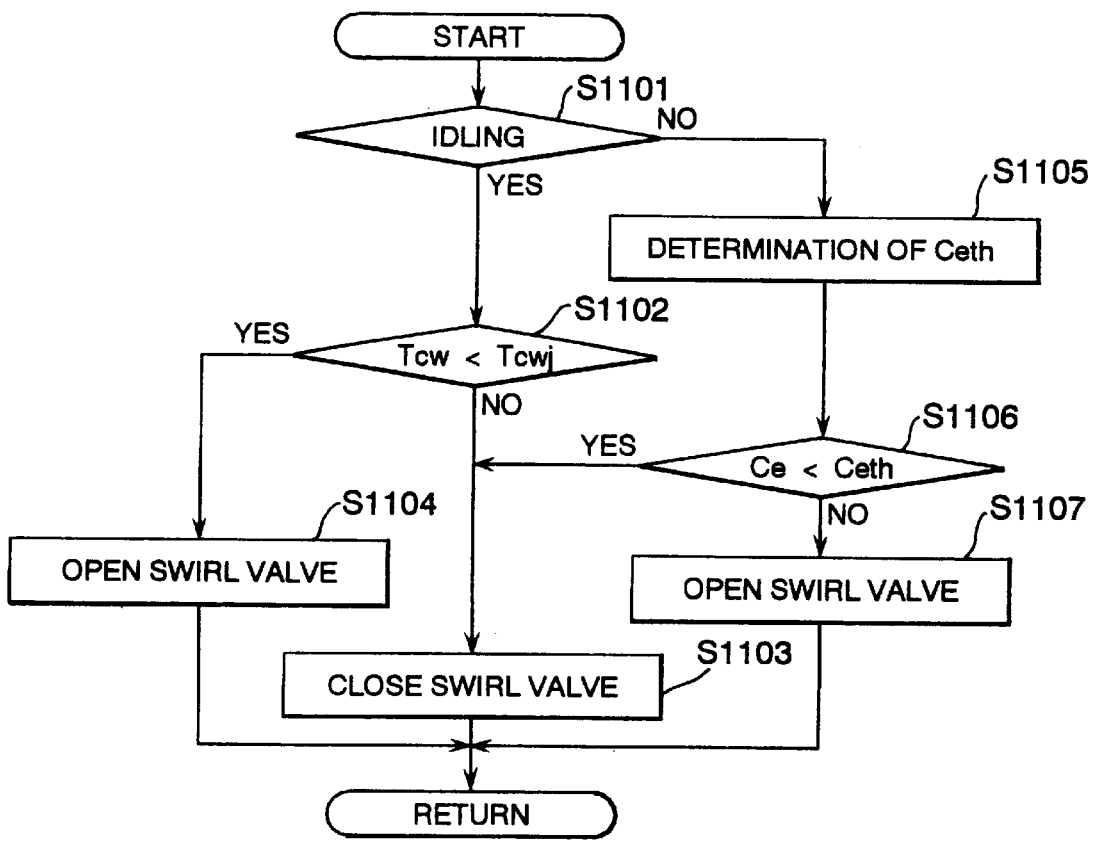
FIG. 32 is a flow chart illustrating a sequence routine of swirl valve control for a microprocessor of the engine control unit of FIG. 19.

FIG. 32 is a flow chart illustrating a sequence routine of swirl valve control.

As shown, when the flow chart logic commences and control proceeds directly to a judgement at step S1101 as to whether the engine is idling. When the throttle valve 14 is in its closed position and an engine speed Ne is higher than a specific speed, the engine 1 is determined to be idling. When the engine 1 is idling, another judgement is made at step S1102as to whether a current cooling water temperature Tcw is lower than a specified temperature Tcwj, for example 60° C. When the current cooling water temperature Tcw is lower than the specified temperature Tcwj, this indicates that the engine 1 is still cold, then, the swirl valve 18 is closed at step S1103. When the current cooling water temperature Tcw is higher than the specified temperature Tcwj, this indicates that the engine 1 has been warmed up, then, the swirl valve 18 is opened at step S1104. Accordingly, as shown in FIG. 26(F), when the engine 1 is cold, the swirl valve 18 is closed to generate a swirl in the combustion chamber 6, promoting mixing fuel and air, as a result of which, aggravation of fuel vaporization due to cold engine operation is complemented and fuel ignitability is well maintained.

Figure 33:
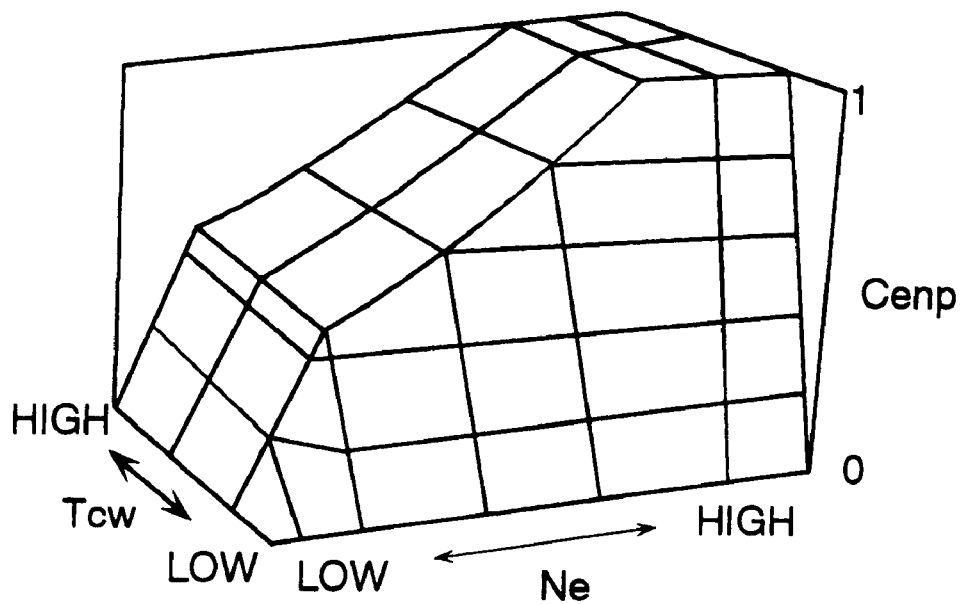
FIG. 33 is an illustration of a swirl valve opening control map.

On the other hand, when the engine 1 is not idling at step S1101, a threshold air charging efficiency Ceth is determined based on with reference to an air charging efficiency map at step S1105. As shown in FIG. 33, the air charging efficiency map specifies opening of the swirl valve 18 relative to cooling water temperature Tcw, engine speed Ne and air charging efficiency Ce. The swirl valve 18 is controlled to close in a range of lower cooling water temperatures, lower engine speeds and lower loading (lower air charging efficiency). Specifically, air charging efficiency Ceref is determined as a threshold air charging efficiency Ceth according to a current engine speed Ne and a current cooling water temperature Tcw with reference to the air charging efficiency map. Subsequently, a current air charging efficiency Ce is compared with the threshold air charging efficiency Ceth at step S1106. When the current air charging efficiency Ce is lower than the threshold air charging efficiency Ceth, the swirl valve 18 is closed at step S1103. On the other hand, when the current air charging efficiency Ce is higher than the threshold air charging efficiency Ceth, the swirl valve 18 is opened at step S1107.

As described above, while the engine 1 is not idling, the swirl valve 18 is controlled to be opened or closed based on cooling water temperature Tcw, engine speed Ne and engine loading. During cold engine operation, the swirl valve 18 is opened to produce and maintain a swirl in the combustion chamber 6, accelerating mixing of fuel and air. On the other hand, in a zone of higher engine loading, the swirl valve 18 is opened to secure a large quantity of high engine output torque.

In this embodiment, the ISC valve control governed at the idle speed control block 41 of the ECU 55 is executed in approximately the same manner as in the first embodiment (FIG. 14). That is, as shown in FIG. 26(D), the idle speed control valve 21 is controlled to remain fully closed until there occurs a boost of engine speed due to complete combustion and, when an engine speed drops below a target engine speed for cold engine operation, i.e. as soon as the on-idle ignition timing control commences, it is feedback controlled to attain the target engine speed when the engine speed. Accordingly, in the event where the catalyst is not yet warmed up after an engine start, acceleration of a rise in catalyst temperature is effected as well as securing fuel combustion stability by controlling an ignition timing. Further, the ignition timing control is executed immediately after completion of an engine start, so that the catalyst is activated within the shortest period of time. Due to making judgement of completion of an engine start after a lapse of the specified time period from a point of time at which a judging engine speed is reached, the ignition timing control is executed in the manner to give engine startability priority over activation of the catalyst. Furthermore, while accelerating a rise in catalyst temperature, the engine speed is maintained stable and gradually drops with a rise in cooling water temperature through the on-idle feedback control of ignition timing and an intake air flow, there is no unnatural feeling. The air-fuel ratio feedback control is executed only after the $O_2$ sensor 26 has been normally activated after an engine start, so that the air-fuel ratio control is precise and consequently, the emission level of hydrocarbons and carbon monoxide is lowered.

In the above embodiments, in place of advancing an ignition timing in order to stabilize fuel combustion, it may be done to enrich an air-fuel mixture. Further, in place of making a judgement of activation of the catalyst based on cooling water temperature, a temperature sensor may be installed near the catalyst in the exhaust passage 25 to detect directly a temperature of the catalyst. Although, in the second embodiment, stabilization of heavy fuel combustion is achieved by restraining a retard of ignition timing, it may be done to interrupt execution the ignition timing retard control when a heavy fuel is supplied. In the third embodiment, the control of acceleration of a rise in catalyst temperature may be executed only when the temperature of cooling water is lower than a predetermined temperature of, for example, 0° C. By the way, in the event where fuel vaporization is significantly aggravated due to low temperatures in, for example, a cold district, the stabilization of fuel combustion can be given first priority, so that the engine is prevented from discharging an increased level of harmful emissions when unstable fuel combustion possibly occurs.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A fuel combustion control system for an internal combustion engine having a plurality of cylinders connected to an exhaust line which is equipped with an exhaust gas purifying catalyst for performing acceleration control of a rise in catalyst temperature by retarding an ignition timing from a point of time at which the engine produces maximum output torque while the exhaust gas purifying catalyst remains inactive, said fuel combustion control system comprising:

speed detecting means for detecting an engine speed of the engine;

variable air intake means for varying a quantity of intake air that bypasses through an engine throttle valve and is admitted to the engine;

idle detection means for detecting idling of the engine;

activated condition detection means for detecting whether or not said exhaust gas purifying catalyst is in an activated condition; and control means for determining fluctuations in said engine speed for each said cylinder and controlling fuel combustion by controlling at least one control value of an ignition timing, an air-fuel ratio and an air flow in an combustion chamber of the engine so as to maintain said fluctuations below a limit on stability of fuel combustion while said exhaust gas purifying catalyst remains inactive;

wherein said control means gives priority to said ignition timing control and controls said ignition timing to perform engine speed feedback control so as to attain a predetermined idle engine speed while said idle detection means idling of the engine and said activated condition detecting means detects said exhaust gas purifying catalyst to be in said activated condition, and to interrupt said engine speed feedback control as well as controlling said variable air intake means to provide an increase in intake air quantity when performing said acceleration control of a rise in catalyst temperature while said idle detection means idling of the engine and said activated condition detecting means detects said exhaust gas purifying catalyst to be not in said activated condition.

2. The fuel combustion control system as defined in claim 1, wherein said control means controls said variable air intake means to provide an increase in intake air quantity so as to attain an engine speed higher than said predetermined idle engine speed.

3. The fuel combustion control system as defined in claim 1, wherein said control means determines fluctuations in said engine speed for each said cylinder and controls fuel combustion for each said cylinder.

4. The fuel combustion control system as defined in claim 1, wherein said activated condition detection means monitors a temperature of engine cooling water, and said control means judges that the exhaust gas purifying catalyst is inactive when said activated condition detection means detects said temperature of engine cooling water lower than a predetermined temperature for a predetermined time from an engine start.

5. The fuel combustion control system as defined in claim 1, wherein said control means makes a judgment of heaviness of a fuel based on said fluctuations in said engine speed and controls at least one of said ignition timing, said air-fuel ratio and said air flow based on a result of said judgment of heaviness so as to stabilize fuel combustion and controls said ignition timing to advance larger for a fuel with higher degree of heaviness than for a fuel with lower degree of heaviness.

6. The fuel combustion control system as defined in claim 1, wherein said control means makes a judgment of heaviness of a fuel based on said fluctuations in said engine speed and controls at least one of said ignition timing, said air-fuel ratio and said air flow based on a result of said judgment of heaviness so as to stabilize fuel combustion and controls said air-fuel ratio to shift richer for a fuel with higher degree of heaviness than for a fuel with lower degree of heaviness.

7. The fuel combustion control system as defined in claim 1 wherein said control means learns said one control value when said idle detection means detects idling of the engine and reflecting a learned value on an initial value of said one control value.

8. The fuel combustion control system as defined in claim 1, wherein said control means controls said air flow to be intensified while said activated condition detection means detects said temperature of said engine cooling water lower than a predetermined temperature.

9. The fuel combustion control system was defined in claim 1, wherein said exhaust gas purifying catalyst is installed in an exhaust passage of said exhaust line downstream from an exhaust manifold connected to said exhaust line.

10. A fuel combustion control system for an internal combustion engine having a plurality of cylinders connected to an exhaust line with an exhaust gas purifying catalyst installed therein for performing acceleration control of a rise in catalyst temperature by retarding an ignition timing from a point at which the engine produced maximum output torque while the exhaust gas purifying catalyst is before activation, said fuel combustion control system comprising:

speed detecting means for detecting an engine speed of the engine;

an air-fuel ratio sensor normally activated after an engine start to monitor oxygen concentration of exhaust gas from the engine by which an air-fuel ratio is represented; and control means for giving priority to said ignition timing control, determining fluctuations in said engine speed, judging completion of an engine start, and performing control of fuel combustion by controlling at least one control valve of an ignition timing, an air-fuel ratio and an air flow in an combustion chamber of the engine so as to maintain said fluctuations below a limit on stability of fuel combustion while the exhaust gas purifying catalyst remains inactive;

wherein said control means commences said control of fuel combustion and said acceleration control of a rise in catalyst temperature immediately when judging completion of an engine start and feedback controls said air-fuel ratio to remain approximately a stoichiometric air-fuel ratio.

11. The fuel combustion control system as defined in claim 10, and further comprising activated condition detection means for monitoring a temperature of engine cooling water, wherein said control means interrupts said acceleration control of a rise in catalyst temperature when said activated condition detection means detects said temperature lower than a predetermined temperature.

12. The fuel combustion control system as defined in claim 10, wherein said control means judges said completion of an engine start on the basis of a lapse of a predetermined period of time while said speed detecting means detects a specified engine speed lower than a predetermined idle engine speed.

13. The fuel combustion control system as defined in claim 10, and further comprising activated condition detection means for monitoring a temperature of engine cooling water, wherein said control means controls said air flow to be intensified while said activated condition detection means detects said temperature of said engine cooling water lower than a predetermined temperature.

14. The fuel combustion control system as defined in claim 10, and further comprising variable air intake means for varying intake air quantity bypassing an engine throttle valve and admitted to the engine and idle detection means for detecting idling of the engine, wherein said control means controls said variable air intake means to perform engine speed feedback control so as to attain a predetermined idle engine speed while said idle detection means detects idling of the engine, controls said ignition timing with a feedback control valve to perform engine speed feedback control so as to attain a predetermined idle engine speed while said idle detection means detects idling of the engine, and changing said feedback control valve smaller when performing said acceleration control as a rise in catalyst temperature while said activated condition detection means detects said temperature of said engine cooling water lower than a predetermined temperature as compared with said feedback control valve was activated condition detection means detects said temperature of said engine cooling water higher than said predetermined temperature.

15. The fuel combustion control system as defined in claim 10, and further comprising activated condition detection means for monitoring a temperature of engine cooling water, wherein said control means reduces said feedback control valve for said feedback control of said air-fuel ratio while said activated condition detection means detects said temperature of said engine cooling water lower than a predetermined temperature.

16. The fuel combustion control system as defined in claim 10, wherein said control means judges said completion of an engine start on the basis of a lapse of a predetermined period of time while said speed detecting means detects a specified engine speed lower than a predetermined idle engine speed.

17. The fuel combustion control system as defined in claim 10, wherein said control means judges said completion of an engine start on the basis of a lapse of a predetermined period of time while said speed detecting means deters a specified engine speed lower than a predetermined idle engine speed.

18. The fuel combustion control system as defined in claim 10, wherein said exhaust gas purifying catalyst is installed in an exhaust passage of said exhaust line downstream from an exhaust manifold connected to said exhaust line.

* * * * *